(12) United States Patent
Goodman

(10) Patent No.: US 6,236,718 B1
(45) Date of Patent: *May 22, 2001

(54) VIDEO TRANSMISSION AND CONTROL SYSTEM UTILIZING INTERNAL TELEPHONE LINES

(75) Inventor: David D. Goodman, Arlington, VA (US)

(73) Assignees: Inline Connections Corporation, Arlington, VA (US); CAIS, Inc., Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/292,895

(22) Filed: Apr. 16, 1999

Related U.S. Application Data

(63) Continuation of application No. 08/819,120, filed on Mar. 17, 1997, which is a continuation of application No. 08/431,270, filed on Apr. 28, 1995, now abandoned, which is a continuation of application No. 08/181,562, filed on Jan. 13, 1994, now abandoned, which is a continuation of application No. 08/062,148, filed on May 14, 1993, now abandoned, which is a continuation of application No. 07/688,864, filed on Apr. 19, 1991, now abandoned, which is a continuation of application No. 07/379,751, filed on Jul. 14, 1989, now Pat. No. 5,010,399.

(51) Int. Cl.[7] .................................................. H04M 11/00
(52) U.S. Cl. ..................................... 379/90.01; 93/102.03
(58) Field of Search ........................... 379/90.01, 93.01, 379/93.05–93.08, 93.15, 93.26, 93.28, 93.37, 110.01, 102.01–102.03; 348/14–16, 7, 734; 359/142, 145–148

(56) References Cited

U.S. PATENT DOCUMENTS

| 3,723,653 | 3/1973 | Tatsuzawa . |
|---|---|---|
| 3,937,889 | 2/1976 | Bell, III et al. . |

(List continued on next page.)

FOREIGN PATENT DOCUMENTS

| 0 062 442 | 10/1982 | (EP) . |
|---|---|---|
| 2 166322 | 4/1986 | (GB) . |
| 2 166328 | 4/1986 | (GB) . |
| 1-27358 | 1/1989 | (JP) . |
| WO 88/05979 | 8/1988 | (WO) . |

OTHER PUBLICATIONS

Hoffmann, "Cable, Television, and the Consumer Electronic Bus," The Int'l T.V. Symposium–Montreux, Switzerland, pp. 165–173, 1987.

(List continued on next page.)

*Primary Examiner*—Wing F. Chan
(74) *Attorney, Agent, or Firm*—Fish & Richardson P.C.

(57) ABSTRACT

A video transmission system for facilitating transmission of video and control signals, particularly infrared remote control signals, between different locations in a residence using existing telephone wiring. Simultaneous transmission of signals of both types over active telephone lines is possible without interference with telephone communications. Transmission succeeds without requiring special treatement of the video signals beyond RF conversion, despite signal attenuation inherent in transmission over the telephone line media. Two or more video sources may be tied into the system, and selected as desired. Remote control signals generated in one room may be utilized without requiring a clear line of sight between the remote control device and the receiver.

63 Claims, 8 Drawing Sheets

U.S. PATENT DOCUMENTS

| | | |
|---|---|---|
| 3,974,337 | 8/1976 | Tatsuzawa . |
| 3,992,589 | 11/1976 | Kuegler . |
| 4,054,910 | 10/1977 | Chou et al. . |
| 4,302,629 | 11/1981 | Foulkes et al. . |
| 4,328,579 | 5/1982 | Hashimoto et al. . |
| 4,509,211 | 4/1985 | Robbins . |
| 4,546,212 | 10/1985 | Crowder, Sr. . |
| 4,608,686 | 8/1986 | Barsellotti . |
| 4,670,874 | 6/1987 | Sato et al. . |
| 4,679,227 | 7/1987 | Hughes-Hartogs . |
| 4,709,412 | 11/1987 | Seymour et al. . |
| 4,757,495 | 7/1988 | Decker . |
| 4,757,497 | 7/1988 | Beierle . |
| 4,766,402 | 8/1988 | Crane . |
| 4,776,006 | 10/1988 | Comerford et al. . |
| 4,785,448 | 11/1988 | Reichert et al. . |
| 4,785,472 | 11/1988 | Shapiro . |
| 4,799,213 * | 1/1989 | Fitzgerald . |
| 4,807,225 | 2/1989 | Fitch . |
| 4,825,435 | 4/1989 | Amundsen . |
| 4,829,570 | 5/1989 | Schotz . |
| 4,849,811 | 7/1989 | Kleinerman . |
| 4,882,747 | 11/1989 | Williams . |
| 4,885,803 | 12/1989 | Hermann et al. . |
| 4,890,316 | 12/1989 | Walsh et al. . |
| 4,893,326 | 1/1990 | Duran et al. . |
| 4,918,688 * | 4/1990 | Krause et al. . |
| 4,924,492 | 5/1990 | Gitlin . |
| 4,949,187 | 8/1990 | Cohen . |
| 4,953,160 | 8/1990 | Gupta . |
| 4,955,048 | 9/1990 | Iwamura et al. . |
| 4,985,892 | 1/1991 | Camarata . |
| 5,025,443 | 6/1991 | Gupta . |
| 5,036,513 | 7/1991 | Greenblatt . |
| 5,089,886 | 2/1992 | Grandmougin . |

OTHER PUBLICATIONS

Nichols, "Build a Pair of Line–Carrier Modems," pp. 87–91, 1988.

Olshanksky, "A full service network for the copper plant," Telephony, pp. 52–60, 1985.

Sheets and Graf, "Build This Carrier Current Receiver," Radio Electronics, pp. 55–64, 1989.

Sheets and Graf, "Build This Carrier Current Audio Transmitter," Radio Electronics, pp. 54–94, 1989.

"TeleConcepts . . . Introduces the 'Just Plug It In' Intercom System," TeleConcepts Brochure, Newington, CT, 2 pp, undated.

"Remote Extender Owner's Manual", Windmaster Manufacturing brochure, DeFuniak Springs, FL, 7 pp., undated.

"Model 4000 Series," Lightwave Systems, Inc., brochure, 6 pp., undated.

"IBM races to the desktop," 1 pp., undated.

"Video Transmission System—Send video over ordinary wire—no coax required," Javelin brochure, 2 pp., undated.

TeleVideo brochure, 2 pp., undated.

Advertisement for a MasterMind universal remote control device, 1989.

"Instant Network Rides on Phone Lines," Electronic Design, 1987.

Design and Engineering Exhibition listing.

* cited by examiner

| | RF CONVERSION WITHIN THE VIDEO SOURCE TRANSCEIVER | RF CONVERSION WITHIN THE TELEVISION TRANSCEIVER |
|---|---|---|
| SYSTEM 1 | CONVERT ENERGY WITHIN THE 12 MHZ BAND BETWEEN 60 MHZ AND 72 MHZ, WHICH COVERS VHF CHANNELS 3 AND 4, TO A 12 MHZ BAND LOWER IN FREQUENCY. EXAMPLE: A DOWNSHIFT OF 36 MHZ WOULD MAP VHF 3/4 TO THE BAND BETWEEN 24 MHZ AND 36 MHZ. | CONVERT THE ENERGY IN THE RESULTING 12 MHZ BAND UPWARDS BY AN EQUAL AMOUNT, MAPPING THE SIGNAL BACK TO ITS ORIGINAL CHANNEL. |
| SYSTEM 2 | MODULATE THE BASEBANDED SIGNAL TO ONE OF TWO ADJACENT 6 MHZ BANDS BELOW VHF 2, ACCORDING TO A SWITCH SET BY THE USER. EXAMPLE: MODULATE THE SIGNAL TO EITHER THE BAND COVERING 24 MHZ TO 30 MHZ, OR THE BAND COVERING 30 MHZ TO 36 MHZ. | COVERT THE 12 MHZ BAND COVERING BOTH ADJACENT SUB-VHF 2 CHANNELS UPWARDS TO ADJACENT TUNABLE CHANNELS. EXAMPLE: AN UPWARDS CONVERSION OF 150 MHZ WOULD CONVERT SIGNALS TO THE 12 MHZ BAND COVERING 174 MHZ TO 186 MHZ, WHICH CORRESPONDS TO VHF CHANNELS 7 AND 8. THE FREQUENCY OF THE INPUT SIGNAL WOULD DETERMINE THE OUTPUT FREQUENCY. |
| SYSTEM 3 | MODULATE THE BASEBANDED SIGNAL TO A 6 MHZ BAND BELOW VHF 2, THE BAND COVERING 24 MHZ TO 30 MHZ, FOR EXAMPLE. | CONVERT THE 6 MHZ BAND CONTAINING THE SIGNAL UPWARDS TO ONE OF TWO ADJACENT TUNABLE CHANNELS, ACCORDING TO A SWITCH ON THE TELEVISION TRANSCEIVER. EXAMPLE: A CONVERSION OF 150 MHZ OR 156 MHZ UPWARDS WOULD MAP THE SIGNAL TO VHF CHANNEL 7 OR 8. |

FIGURE 3

VIDEO TRANSMISSION AND CONTROL SYSTEM UTILIZING INTERNAL TELEPHONE LINES

RELATED APPLICATIONS

This application claims the benefit of priority under 35 USC 120 and is a continuation of U.S. application Ser. No. 08/819,120, filed Mar. 17, 1997, which is a continuation of U.S. application Ser. No. 08/431,270, filed Apr. 28, 1995, now abandoned, which is a continuation of U.S. application Ser. No. 08/181,562, filed on Jan. 13, 1994, now abandoned, which is a continuation of U.S. application Ser. No. 08/062,148 filed on May 14, 1993, now abandoned, which is a continuation of U.S. application Ser. No. 07/688,864, filed Apr. 19, 1991, now abandoned, which is a continuation of U.S. application Ser. No. 07/379,751, filed Jul. 14, 1989, now U.S. Pat. No. 5,010,399.

BACKGROUND OF THE INVENTION

The present invention relates to a system for transmitting signals between components of a video system over the telephone wiring of a residence.

Until the late 1970's, it was very unusual for ordinary consumers to own electronic devices that generated or supplied video signals. Virtually all video programs viewed on television sets were received "over the air". This situation changed over the past decade as VCRs, video cameras, cable converters, and home satellite systems became popular.

Currently, many consumers are able to watch video programs at different locations because they own more than one television set. When viewing programs from one of the sources mentioned above rather than those picked up "over the air", however, it is necessary to convey the signal from the video source to the television set. When source and receiver are located in the same room, connecting the two with a coaxial cable is usually the easiest method. VCRs and cable converters are nearly always connected to nearby television sets in this manner.

When the source and receiver are not located in the same area, a network of coaxial cabling extending through the residence is a fine solution. Most residences, however, are not wired this way, or have networks that do not allow access at all desired locations. Furthermore, most consumers insist that the wiring be neatly installed or kept entirely out of sight, making installation of a network very difficult and unwieldy. This presents a problem when connection between a video source and a television requires wiring that extends between rooms, especially rooms located far from each other, or on different levels.

Today, it is very common for a residence to include a VCR and a television located in a "sitting room", and a second television located in a bedroom. This has generated an enormous demand for technology that transmits video across a residence without requiring installation of new wires. Possible solutions are to broadcast the signal at low power, or to use power lines or telephone wiring, which are always available, as a conductive path.

Broadcasting is currently not feasible in the U.S. because of FCC regulations, and is not feasible in most other countries for similar reasons. (Several consumer devices that broadcast video at low power have been marketed, however, despite their clear violation of FCC regulations. This testifies to the existence of a large demand for transmission of video over short distances.) In addition to legal obstacles, the possibility of unintended reception of broadcast signals outside residences, and the possibility of interference from other sources broadcasting at the same frequency also present problems.

Regulations covering transmission between source and receiver over conductive paths are much less restrictive, and signals transmitted by this method are much less likely to encounter interference from other signals or be open to interception. Transmission across power wiring is very difficult, however, because appliances typically attached to those networks often impart electrical noise at many different radio frequencies, creating a high potential for interference. Furthermore, a reliable conductive path is not always available across "fuse boxes", causing problems when source and receiver derive power from different circuits.

The difficulties in transmitting video by broadcasting or by conduction over power lines leave conduction over telephone wiring as the sole remaining option. This technique also involves very serious technological and legal challenges, however, and no solution has been found.

The most obvious difficulties are avoiding interference with telephone communications and conforming with all regulations that govern devices that connect to the public telephone network. Because telephone wiring in the US and many other countries typically includes four conductors, only two of which are used for communications in residences served by a single telephone number, availability of the unused pair would seem to present an interesting opportunity for avoiding these problems. Unfortunately, wiring installers often do not connect the unused pair at the network junctions, leaving breaks in the conductive paths offered by these wires.

The path supplied by the active pair, on the other hand, is guaranteed to be continuous between two jacks as long as telephone devices become active when connected at those jacks. An exception is residences where each jack is wired directly to a central electronic switching unit that provides an interface to the public telephone system. The conductive paths between jacks are likely to be broken across this unit.

There are other technical and legal problems associated with transmission over this wiring beyond those created by the connection to a public or private telephone network. The technical problems derive from the fact that transmission of video was not a consideration when standards for wire properties, installation and connection techniques, and telephone electronics were established. Because these are all factors that can influence the ability of the wiring to reliably transmit high quality RF signals, this environment is poorly suited for transmission of video.

Further legal problems derive from the fact that all RF signals conducted across unshielded wiring will broadcast at least some electromagnetic radiation. (Unlike coaxial cable, telephone wiring is not shielded by a grounded metallic conductor that eliminates radiation.) Because restrictions on RF radiation are very limiting in the US and most other countries, they can potentially defeat any particular electronic technique that could otherwise successfully achieve transmission.

Systems have been developed to transmit video signals over ordinary telephone wiring, but none is practical for the residential application described. Chou (U.S. Pat. No. 4,054,910) discloses a system for transmitting video over an ordinary pair of wires without boosting the video signal in frequency. Video signals transmitted by devices that follow that design, however, would include energy at low frequencies that would interfere with telephone signals.

Tatsuzawa (U.S. Pat. No. 3,974,337) discloses a system that slightly boosts video signals in frequency (by approximately 0.5 Mhz) to prevent conflict with voiceband communications. The system also requires, however, a sophisticated procedure for compressing the bandwidth of the signal so as to avoid use of energies at the higher frequencies, which attenuate quickly. Further, the higher end of the resulting band is "preemphasized", or amplified more than the lower frequencies, in order to account for the remaining differences in attenuation.

The purpose of the technique disclosed by Tatsuzawa is to allow video signals to travel distances on the order of 1 km or more. The electronics that reduce and expand the signal bandwidth however, are very expensive. There is also a major difficulty in that the preemphasis of the signal must be adjusted depending on the distance between source and receiver. This is of significant inconvenience to a consumer. Further, the system depends on electrical characteristics particular to frequencies between 0 and 4 Mhz, limiting the transmission frequency to that band. This creates legal problems because in the U.S., for example, regulations severely limit the RF energy below 6 Mhz that can be fed to wiring that is connected to the public telephone network. Finally, the restriction to a single band allows for transmission of only a single signal.

There are countless methods for reducing the resolution or the refresh rate of a video signal in order to reduce the bandwidth enough to avoid the problem of attenuation, e.g. Lemelson (U.S. Pat. No. 4,485,400). Current video standards in the U.S. and elsewhere, however, use a refresh rate just quick enough to avoid annoying "flickering" of the picture. Because most consumers have little tolerance for "flickering" or a reduced picture quality, these techniques do not present solutions to the problem at hand.

Two commercially available devices are known by the inventors to transmit uncompromised video across telephone wiring. The first device is marketed by several cable equipment supply companies, e.g. the J411 system marketed by Javelin Electronics of Torrance, Calif. The list price of this device is nearly $1000.

The device transmits a single unmodulated video signal across the wiring. Because some of the energy of these signals is concentrated at frequencies below 3 khz, the device will cause interference with telephone communications. Further, the specifications stipulate that "transmission must be via dedicated twisted pair (of which telephone wiring is a subset) . . . and must be clean, unloaded, and unconnected to any other device." The device also "preemphasizes" the signal by imparting more amplification at the higher frequencies, adding expense and the inconvenience of requiring adjustment on the part of the user.

The second device, "Tele-Majic," is marketed by Impact 2000, a catalog specializing in consumer electronic devices. This device is composed of a pair of identical connecting cables. These cables are advertised as enabling one to connect a video source to a residential telephone line in one area, and a television receiver in a second area, for the purpose of viewing the source at the second location.

Each cable consists of a classic matching transformer which connects to the video devices, a capacitor for blocking telephone signals to prevent interference, and a telephone cord terminated with a "male" RJ-11 plug, the standard plug for connection to a telephone jack.

The device is intended to work by simply feeding the video signal from the source on to the wiring, and recovering it at a remote location. For several reasons, it does not nearly solve the problem at hand.

To begin with, because "Tele-Majic" does not provide a video amplifier, the strength of the signal fed to the wiring will be limited by the strength of the signal supplied by the source. This causes a problem because the output signal levels generated by VCRs sold in the U.S. are limited by law to approximately 10 dB re 1 mV into 75 ohms. At this level, the video signal can transmit only a few feet before the wiring will attenuate its energy below the level required for quality television reception.

Beyond the limitations caused by low signal power, the matching transformer of the "Tele-Majic", which constitutes half of the electronics in the device, is significantly suboptimal, and does not teach anything about the correct purpose of that component. In an apparent attempt to economize, the common 75 ohm/300 ohm matching transformer, built to connect between 75 ohm coaxial cabling and "twin-lead" wiring was chosen. Because matching transformers of the same design are included with virtually every video device sold in the U.S., these are extremely inexpensive to obtain.

A matching transformer can serve the purpose of matching the impedance of video equipment to telephone wiring. The impedance of typical telephone wiring, however is approximately 100 ohms at low VHF channels, not 300 ohms. This will create an impedance mismatch, and video signals will lose more energy than is necessary when passing from the source onto the network via this cable.

The transformer can also serve the purpose of balancing the voltages on the two leads of the telephone wiring, in order to reduce electromagnetic radiation. Because the transformer used by "Tele-Majic" is designed to handle signals at all video frequencies, however, it cannot balance the video signal nearly as well as a transformer specifically tailored for a specific frequency. The lack of balance will cause more radiation than would be released by a maximally balanced signal.

Another problem is that complete isolation of telephone signals using the particular transformer supplied with the device requires two capacitors rather than the single one which comes with "Tele-Majic". This design flaw will cause total disruption of telephone communications when the device is connected to a coaxial port whose outer shield connects to ground.

Given the ability to transmit video signals throughout a residence, the viewer of signals at a remote television remains limited in the ability to control the apparatus that supplies the signal. Many video sources, especially VCRs and cable converters, are designed to cooperate with hand-held controllers that send out infrared control signals upon command of the user. Unfortunately, signals from these devices do not travel between rooms unless there is a line-of-sight path between transmitter and source. It follows that a significant demand for transmission of control signals should arise as a result of technology that succeeds in transmitting video across telephone wiring. Furthermore, there is an obvious economy in achieving this transmission using the same wiring used for transmitting video.

Robbins (U.S. Pat. No. 4,509,211) discloses the only known method for transmitting control signals from an infrared transmitter over a transmission line that also is used to transmit video signals. That method converts the infrared signals received in the area of a television to electrical impulses, which, due to the nature of typical infrared control signals, are concentrated at frequencies below 1 Mhz, lower than typical video frequencies. Those impulses are transmitted across the transmission line to the area of a programmable video source, where they are converted back to infrared energy, recreating the original light pattern.

The technology taught by Robbins, however, is not adequate for situations where the energy of other signals sharing the transmission line is concentrated at frequencies that fall within the frequency bands that confine the control signal energy. This is the case when active telephone wiring serves as the transmission line. Under the method Robbins discloses, signals from infrared controllers will conflict with telephone communication signals because they both have information content at frequencies between 0 and 3 khz. Any receiver that is tuned to frequencies between 0 and approximately 3 khz, such as a telephone set, will react to both telephone signals and control signals. Either telephone communications will be noisy, or the infrared signals will be ambiguous, or both. (If one signal is much stronger than the other, that signal may be received without distortion.) Furthermore, the system will fail whether or not video signals are present.

Robbins discloses devices that include, in combination with other technology, "isolation circuitry" which prevents the electrical signals derived from infrared light patterns from reaching the video source and the television receiver. Robbins teaches that "power lines, telephone lines or other existing conductor systems can be used, providing the various signals do not interfere, or providing isolation means are provided." This is incorrect. If two signals overlap in frequency, no isolation means will cleanly separate them so that only the desired signal reaches the receiver that is designed to react to it.

Indeed, the isolation circuitry disclosed is totally unnecessary even for the very application that is the focus of the Robbins patent. Under the system Robbins discloses, video signals and control signals transmit across a single conductive path at non-overlapping frequencies, and isolation circuitry is provided to block the control signals from the video source and the television receiver connected to this path. Because VCRs and virtually all other video sources have reverse isolation provided at their output ports, electrical energy incident at these ports will have no effect at all, and extra isolation is not required. Further, when a television is tuned to a particular video channel, signals at frequencies outside of that channel are ignored unless their energy level is very high. The control signals will be ignored in this manner, just as video signals at VHF channel 3 and VHF channel 5 are ignored by a television receiver tuned to VHF channel 4.

Beyond Robbins' incorrect teaching of isolation circuitry and the fact that the infrared transmission system he teaches is inadequate for the present application, Robbins teaches nothing regarding transmission of video over telephone wiring.

An electronic transmitter/receiver pair called the Rabbit follows the electronic principles disclosed in Robbins' patent to send video and infrared signals between a VCR and television. This device, which cites the Robbins patent on its packaging, has been available at retail outlets since 1985. It uses a transmission line composed of a single very thin insulated wire pair which must be installed by the user between the VCR and a television. Thus, it embodies the very difficulty that the current invention seeks to address.

There is another system known for transmitting infrared signals from a television to a remotely located VCR, but it differs in that it uses broadcast technology rather than a transmission line. Called the "Remote Extender" and marketed by Windsurfer Manufacturing of DeFuniak Springs, Fla., this device converts the infrared signals to electrical impulses, then boosts these impulses to a UHF frequency and feeds them to an antenna from which they broadcast. A remotely located receiver picks up these UHF signals, downshifts them back to their original frequency band, and uses the resulting impulses to recreate the original infrared pattern.

Because this system uses broadcast technology, it is much more susceptible to interference, and its receiver has the potential of mistakenly picking up control signals from the transmitter of a second transmit/receive pair operating nearby. Furthermore, it is obviously more economical to use the telephone wiring for transmitting control signals when combining with technology that transmits video using that medium.

The simultaneous transmission of infrared control signals and a single video signal across telephone wiring is the major focus of the technology disclosed herein. It is easy to see, however, the usefulness of extending this technology to allow signals from more than one video source to transmit at a given time.

When each source transmits a signal at a different frequency band, the telephone wire medium should present no barrier to the use by multiple sources. Many factors, however, limit the number of bands that are available. An especially restrictive limit, of course, is imposed by the difficulties of using telephone wiring as a medium. In the event that the number of desired sources exceeds the number of available channels, this limit becomes restrictive.

If a viewer can disable all but one of multiple sources that use the same band, however, the picture from the remaining source can be displayed without interference. This possibility creates a demand for a technique that allows a user to quickly, conveniently, and remotely activate one of several sources that are connected and ready to transmit.

SUMMARY OF THE INVENTION

In view of the foregoing, one object of the present invention is to overcome the difficulties of transmission of video signals and control signals from infrared transmitters across active networks of telephone wiring.

In accordance with this and other objects, the present invention includes a pair of transceivers: a first transceiver which is designed for connection between a video source and a telephone jack or other port of access to a network of telephone wiring, and a cooperating transceiver which is designed for connection between an ordinary television receiver and a telephone jack. These transceivers take advantage of the simple two-wire conductive paths provided by the wiring of ordinary residential telephone systems, and thus provide the following results, in stark contrast to known techniques discussed above:

1) Each television that is connected via a transceiver can display, in addition to any of the other signals otherwise available to it, the signal from any video source connected via a cooperating transceiver as described above.

2) An unlimited number of televisions can connect and operate simultaneously. Each television can select any of the connected sources for display at any time, as long as the source is active, i.e. conducting its signals onto the telephone network wiring.

3) The number of sources that can be active at once will depend on many different factors, but will always be greater than one. The signals from each active source occupy different, non-overlapping frequency bands while transmitting across the wiring.

4) Any number of sources can share a single frequency band, but only one of that group can be active at a given time. The transceivers that connect to the video sources will include one of two technologies for allowing a viewer at any television to remotely and conveniently switch the identity of the active source that is using a particular band.

5) Any video sources that respond to control signals from infrared transmitters and are connected via a transceiver as described above can be controlled from any area where a connected television is located, whether or not such area is within a line of sight of the video source.

6) Operation of telephone and other low-frequency communication, including that conducted by intercoms, fax machines, and modems, is not affected by the connection and operation of any of the devices herein described.

7) All of the capabilities described above are provided by simple connection of the transceivers. No other effort on the part of the user is required.

In addition to these and other objects and results, a design is disclosed for a special television that connects directly to a telephone network. This television is designed to cooperate with the video source transceiver mentioned above. It includes electronics for deriving video signals from the wiring and tuning to them, and will transmit the intelligence of infrared control signals that it detects back over the wiring to the transceiver for control of its connected video source. Like the transceivers, it causes no interference with telephone communications.

A further design is disclosed for an inexpensive device that, in combination with the disclosed transceivers and television, provides the above capabilities to residences equipped with special telephone systems that include a central electronic switching unit.

BRIEF DESCRIPTION OF THE DRAWINGS

FIG. 3 is a chart which describes the three systems disclosed for cooperation between RF conversion components of the two transceivers.

DETAILED DESCRIPTION OF THE PREFERRED EMBODIMENT

Figure 1:
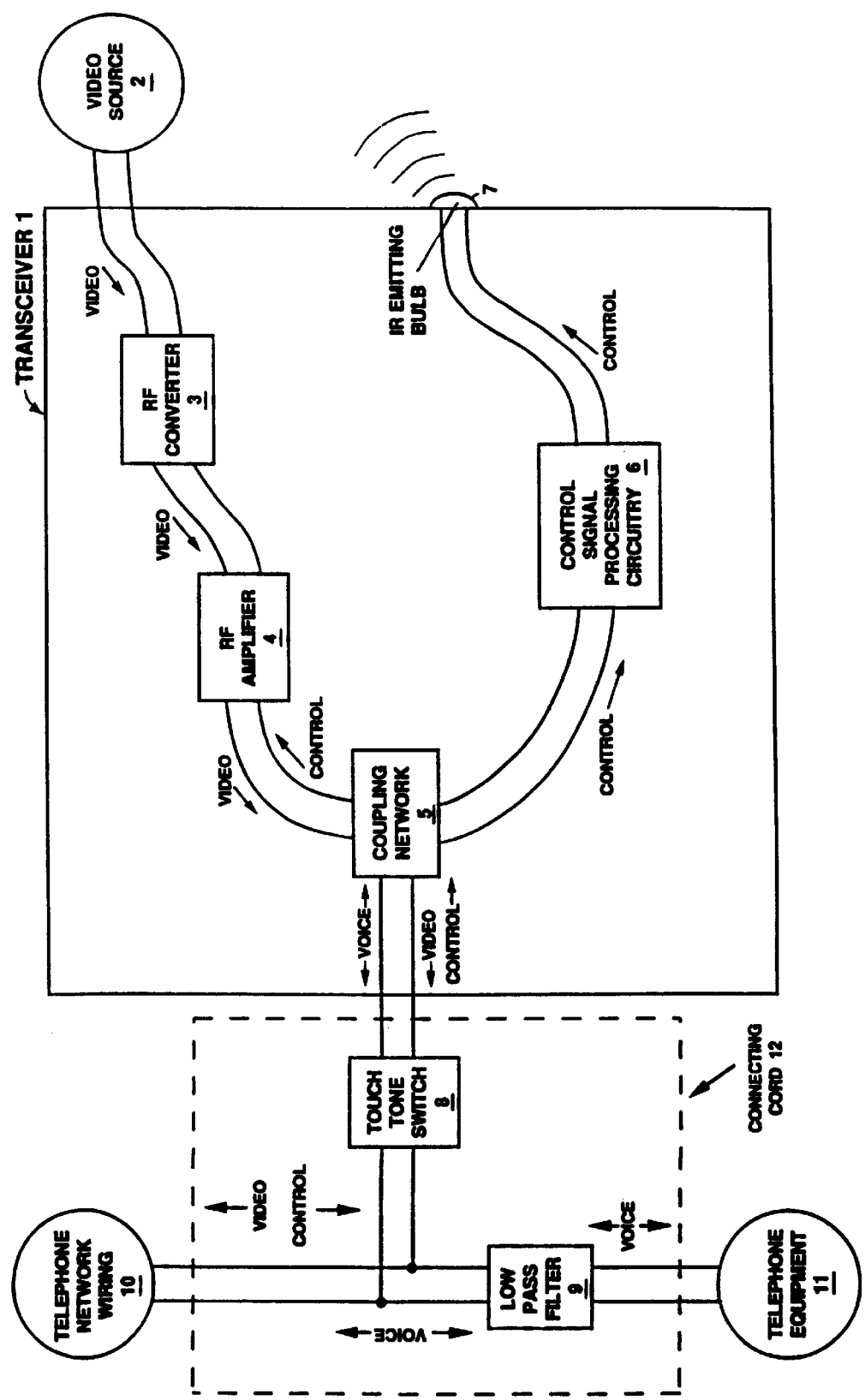
FIG. 1 is a block diagram that illustrates the fundamental components of the video source transceiver and how those components interact with one another.

The devices disclosed herein provide for transmission of video signals and control signals from infrared transmitters across active networks of telephone wiring without affecting ordinary telephone communications. They are designed to accommodate video signals with the same resolutions and refresh rates as those used for public broadcasting. When transmitting signals across path lengths typical of those found in ordinary residences, the devices provide enough signal fidelity to produce undegraded images and unambiguous control commands.

Design of these devices required an extensive experimental and theoretical investigation of the physics of transmission of video signals across this type of network, a deep appreciation of the special need for convenience and economy in consumer products, some circuit design, as well as a novel combination of electrical signal processing components.

A description of the disclosed devices is preceded by an overview of the topic of transmission across telephone wiring. The overview will begin with a summary of the investigation into the transmission of video and will conclude with a description of the method designed to transmit signals from infrared controllers.

The descriptions that follow the overview include several options for the design of the pair of cooperating transceivers, the special television/transceiver pair, and the special adaptor referenced in the summary. The influence of the transmission investigation on these designs as well as the influence of other considerations related to consumer electronics will be included in those descriptions. The advantages and disadvantages of the various designs will also be discussed, and the preferred embodiment will be identified. Finally, the electronic details of some circuitry described in general terms earlier on will be presented.

The signals described as video herein refer to signals that provide picture information encoded according to NTSC, PAL, SECAM, or similar formats that are used for public broadcasting throughout the world. These formats provide between 50 and 60 image frames per second, and vertical resolutions of between 525 and 625 lines per frame.

In general, the disclosed devices are designed to transmit audio information along with video according to these formats. Most of the disclosed technology, however, will function the same whether audio is present or not. For this reason, signals described as video shall refer to signals with or without audio information. An explicit description will be used whenever audio is specifically included or excluded.

Transmission of Video Signals across Telephone Wiring

The following problems must be overcome for transmission of video signals to succeed across a network of telephone wiring:

1) Multi-path effects, also known as "reflections" or "ghosting," can cause video distortion. These effects can arise in a network of wiring because signals can travel from source to receiver via many different paths. If signal energy arrives at the receiver across two paths that differ in length, the signal conducted across one path will be offset in time relative to the signal traversing the second path. This will cause the same image to appear at two different points in the scanning cycle of the picture tube. This can create the special distortion pattern called "ghosting" if the offset difference is large enough. Multi-path "ghosting" of broadcast signals is commonly caused by large buildings that reflect broadcast energy and create multiple paths of significantly different lengths to nearby antennae.

2) Reduction of signal energy across the transmission paths can reduce the signal-to-noise ratio present at a television receiver below that required to produce a high-quality picture. A signal-to-noise ratio of 40 dB is marginally sufficient for high-quality video. It follows that picture degradation will result whenever signal energy at the receiver falls to within 40 dB of the noise level on the wiring or the minimum noise floor of the television receiver.

Three factors are principally responsible for attenuation of the energy of the signal as it travels from source to receiver, resulting in a lower energy at the end of any transmission path. These factors are:

a) Attenuation or dissipation of signal energy by the wiring. Unlike coaxial cable, over which video signals travel with little attenuation, telephone wiring dramatically attenuates high frequency energy. This attenuation increases linearly with path length, and also increases with frequency. At 90 Mhz for example, typical telephone wiring attenuates energy at 14 dB per 100 feet, while at 175 Mhz, attenuation is approximately 25 dB per 100 feet.

b) Network junctions where the wiring splits. These can cause significant attenuation when they occur on one of the principal paths carrying energy from source to receiver. When the alternative path is very long, the energy splits, reducing the level on the main transmission path by approximately 3.5 dB. As the alternate path becomes shorter, attenuation will depend on whether or not the branch is open, or "terminated." If the branch is unterminated, attenuation will be less than this amount, and will be negligible for very short branches. At higher frequencies, the 3.5 dB limit is approached more quickly.

c) Telephone devices that dissipate high frequency energy. A significant number of these devices exhibit this property. If they terminate short branches, as described above, they can drain energy from a principal transmission path. Devices that have a strong dissipative effect can reduce the energy beyond the ordinary 3.5 dB splitting loss. As the length of these branches increases, the attenuation of the branch prevents the draining phenomenon, and the ordinary 3.5 dB splitting loss becomes the dominating factor. At higher frequencies, the 3.5 dB limit is encountered at shorter path lengths.

3) The fact that attenuation increases with frequency can cause the energy near the high end of a 6 Mhz video channel to attenuate more than the energy at the lower end. This causes a "tilt" in the signal power spectrum, which is a form of signal distortion that can cause picture degradation if it is sufficiently pronounced.

4) Interference from strong broadcast signals picked up by the wiring acting as an antenna can cause severe distortion. The ability of the wiring to receive broadcast energy increases with frequency.

5) Because telephone wiring, unlike coaxial cable, is not shielded by a grounded metallic conductor, significant electromagnetic radiation can be created when it conducts electrical energy at radio frequencies. This can create legal problems as well as interference to nearby televisions and other receivers tuned to those frequencies. The level of radiation caused by a given signal level increases with frequency. (In contrast to reguations covering radiation, no special legal problems are created in the U.S. by the connection of radio frequency devices to the public telephone network if those devices do not transmit energy below 6 Mhz. Restrictions are not required because the network wiring will quickly attenuate such energy below any meaningful level.)

One possible strategy for addressing these problems is to recode the video signal into a different waveform with equivalent information before imparting its energy to the wiring. If, for example, the bandwidth of the signal could be compressed without losing information, the problems of tilt, interference, and, possibly, radiation would be reduced. Implementation of compression or other recoding techniques, however, is extremely expensive, and will probably not significantly alleviate all of these problems.

Because some conventions for video encoding and modulation provide signals with redundant information, the bandwidth of a video signal can sometimes be reduced by sharp filtering without significant loss of information. Because the potential reduction would not be large, however, this strategy is also unlikely to significantly alleviate the problems described above.

A second method of waveform alteration is to amplify the higher frequencies of the signal more than those at the low end. This is called "pre-emphasis" and can compensate for "tilting" of the signal. Apart from the fact that it only addresses one of the potential problems, however, pre-emphasis is expensive, and also requires the inconvenience of adjusting the compensation level upon installation in a new residence. This is because the attenuation differential is a proportion of the overall attenuation which, in turn, will vary from one residence to another.

Beyond rewiring a residence, which defeats the purpose of the invention, the only other elements of control that can be exercised to help transmission succeed lie in the choice of the energy level and frequency, and in electronics that can limit the effects of the connected telephone devices. Most individuals skilled in the art, however, expect that an amplified video signal conducted across telephone networks would suffer from "ghosting" at most any frequency and energy level. Others suspect that amplification of the signal high enough to force it across the wiring would create completely unacceptable levels of radiation.

To investigate transmission over this network, the inventors devised and conducted a series of experiments that included observation of the quality of pictures generated from transmitted signals, and also measurements of radiation created by the transmitting signals.

As part of the experiment, a transmit/receive pair was designed, using technology disclosed later herein, to feed amplified video signals through one port on a network and to recover them from a second port. These devices were used to perform experiments in twenty residences using video signals at different energy levels and frequencies. For most of the experiments, telephone equipment was disconnected at the involved ports, but some remained elsewhere on the network. A few tests were performed to investigate the effects of telephone equipment sharing the same port.

The radiation tests involved conduction of video signals on to an unterminated 50 foot length of wiring that was extended horizontally and elevated one foot above ground, and measuring field strength via a calibrated antenna placed 3 meters from the midpoint of the wire. The signals were conditioned to minimize radiation before they were fed to wiring. The conditioning involved a process called "balancing", which is used in the disclosed transceivers and is described later on.

The most natural choices for transmission frequencies are the channels in the low VHF range. In the U.S., the low VHF range is composed of VHF channels 2 through 6, which extend from 54 Mhz to 88 Mhz. VHF channels 2 through 4 constitute one adjacent group of three 6 Mhz wide channels spanning between 54 Mhz and 72 Mhz, and VHF channels 5 and 6 constitute a second adjacent group spanning from 76 Mhz to 88 Mhz.

Channels in the low VHF range are good candidates for transmission frequencies because they constitute the lowest group of channels tunable by ordinary televisions. The benefit of tunability is that television receivers can recover these signals from the wiring in tunable form, eliminating the need for electronics that convert their frequency. The benefits of using the lower frequencies among the VHF channels are the attendant reductions in attenuation and radiation.

A further advantage of tunability is that if the channel is not used for local video broadcasting, there is no possibility of interference from broadcast energy picked up by the wiring in the U.S. That is because the frequency bands allocated to video broadcasting in the U.S. are off limits to any other services.

Because little variation was expected across the low VHF range, tests were conducted only at VHF channel 3. No frequencies above this range were tested because the first tunable channel above VHF channel 6 is VHF 7 which, at 174 Mhz, would exhibit significantly greater attenuation and radiation, and would have no redeeming advantages over the low VHF channels.

To see if further reductions in attenuation and radiation would offset the extra costs associated with using channels below the tunable range, it was decided to investigate transmission at frequencies below VHF channel 2. Because U.S. Federal Communications Commission radiation limits are less restrictive below 30 Mhz, it was decided to choose the channel spanning from 24 Mhz to 30 Mhz.

To the inventors' knowledge, the only applications involving transmission of video signals with high resolutions and refresh rates at frequencies below the tunable range are those where extra bandwidth is needed on a cable TV distribution network. This requirement can arise when there is a need to send video signals over cable from remote locations back to a central transmission site. These frequencies are available for reverse transmission because distribution systems do not ordinarily use frequencies below VHF channel 2. They are not tunable by televisions and have never, to the inventors' knowledge, been used in any consumer video device.

Following is a summary of the results of the transmission and radiation experiments:

1) When a VHF channel 3 signal with a conducted energy level of 37.5 dB re 1 mV was fed onto the wiring at the source end, visibly undegraded pictures were generated from signals recovered at a remote jack in 85% of the test cases. Radiation from signals at this energy level were measured at approximately 200 uV/M at 3 meters.

2) At an energy level of 42.5 dB re 1 mV, video signals concentrated between 24 Mhz and 30 Mhz succeeded in generating a visibly undegraded picture in 100% of the test cases. Radiation levels were approximately 200 uV/M at 3 meters. (This level was the same as the level for VHF channel 3 because a higher conducted signal level was used.)

3) Ghosting was never observed at any frequency or energy level.

4) Interference from a broadcast video source distorted the picture only when it was strong enough to create an undegraded picture via antenna reception. Distant video sources caused no interference. This type of interference, of course, applied only to the tests at VHF channel 3 and not at the 24 Mhz to 30 Mhz channel.

5) Signals from CB radio transceivers, which operate with 5 watts of power and span the range from 26.965 Mhz to 27.4 Mhz caused interference with transmission across the 24–30 Mhz video channel when a CB transmitter was within 50 feet of the telephone wiring. Interference from other sources was not noticed, but is obviously possible when a source transmitting at an interfering frequency is close enough or transmits with enough power.

6) The connection of telephone equipment at ports previously used only by the transceivers occasionally degraded an otherwise high quality picture.

7) No distortion that was noticed could be traced to "tilting" of the signal spectrum.

8) Radiation from signals transmitting across the wiring at VHF channel 3 often caused slight but significant interference to nearby televisions tuned to a VHF 3 signal supplied by a different video source. This occurred most often when a cable converter and VCR both connected to a television receiver, and the television tuned in a signal from the cable converter at VHF channel 3 while the VCR supplied the VHF 3 signal that was transmitted across the telephone wiring. This type of interference occurred on older televisions that did not offer a shielded input port, and also on more modern televisions that connected via a shielded coaxial cable but allowed-slight leakage from other available ports such as twin lead ports. Note that this type of problem will not arise when using VHF channels 5 or 6 for transmission across the wiring, because video sources that supply signals at those channels are very rare.

The survival of enough signal energy to generate a quality picture can be explained by simply considering the attenuation expected over the longest paths typically encountered in residences. If one assumes a minimum television receiver noise figure of 5 dB, a receiver bandwidth of 6 Mhz, and a desired signal-to-noise ratio of 50 dB, one finds that the minimum signal level required at the receiver is 770 uV into 75 ohms. The output level of a typical VCR is approximately 2000 uV into the same impedance, well above the minimum necessary to reliably provide a high quality picture. At 66 Mhz, attenuation of signals transmitted over telephone wiring is approximately 30 dB over 250 feet. It follows that 30 dB of amplification should ensure good signal quality over the longest paths in typical households, except where splits in the wiring and connected telephone equipment cause excessive attenuation.

The lack of "ghosting" can be explained by the fact that there is usually a monotonic relationship between signal transit time and attenuation. (The rare exceptions to this relationship can be caused by a short path over which signals suffer extraordinary attenuation due to the presence of many splits, or the presence of telephone devices connected off short branches Signals traversing such a path might attenuate more than those traversing a longer path that has a longer transit time.) Because of this monotonic relationship, secondary signals arriving at the receiver after traversing long reflected paths will be usually be significantly attenuated relative to signals that travel over the most direct path from the transmitter. The "offset" in the picture that produces "ghosting" is related to the difference in travel times. To be visible, the offset must be at least as wide as the resolution of the television. It can be shown that path length differences that create offsets this large also have enough difference in attenuation to place the energy level of the reflected path at least 40 dB below that of the incident path, which is below the minimum SNR required for a quality picture, making the reflected energy negligible and its interference invisible.

The results of the experiments verified that when two signals are fed to telephone wiring at energy levels that will cause them to generate the same amount of electromagnetic radiation, a signal transmitting at a channel below 54 Mhz has a significantly higher probability of generating a high quality picture than a signal transmitting at a low VHF channel. Transmission at lower frequencies, however, is more susceptible to interference from broadcast sources and also requires somewhat more expensive electronics.

Transmission of Signals from Infrared Controllers across Telephone Wiring

As described in the introduction, the second signal that will be passed between the transceivers is the control signal from an infrared transmitter operating in the area of a connected television. Part of the disclosed transmission technique follows the known strategy of transducing the light pattern created by these signals into electrical energy and transmitting that energy across the wiring in the opposite direction of the video signals, to be received by the transceiver connected to the video source. That transceiver uses the electrical version of the signal to recreate the original infrared light pattern, for the purposes of controlling the video source to which it connects.

The technique disclosed herein embodies an extension designed to avoid interference with telephone signals. The extension calls for the frequency of the electrical version of the control signals to be converted to a higher band before transmission across the wiring. This band will be high enough to eliminate interference with telephone or low-frequency communication signals. After recovery of this signal at the end of the transmission path, the signal is converted back to its original band before being used to recreate the original light pattern.

Maintaining the fidelity of the control signals across the wiring presents less of a challenge than was posed by transmission of video signals. Unevenness, or "tilting" in the signal spectrum is not a problem because the bandwidth of the signal is small. An analysis of the factors governing multi-path interference indicates that that problem should not arise either.

Because the bandwidth of control signals from typical infrared transmitters is considerably less than 1 Mhz, finding a frequency interval that will encounter little interference from ambient broadcast signals is not difficult. Also, the information content is small so that little energy is required for successful transmission. The reduced energy generates less radiation.

Other requirements for the choice of a frequency band and energy level for transmission of these signals are that the band must not overlap, of course, the video signals at the frequencies chosen for video transmission, and the energy must meet the legal requirements that govern devices that connect to the public telephone network. As mentioned earlier, the U.S. Federal Communications Commission imposes no restrictions on signals above 6 Mhz, leaving ample room between that frequency and the video signals, even if a channel below VHF 2 is used. The control signals can also be transmitted above the frequencies used for transmission of video.

A frequency centered at 10.7 Mhz is used in the preferred embodiment because that is a common intermediate frequency in FM radio devices, the result of which is that there are very inexpensive electronic components available that are especially suited for that frequency.

Description of the Transceiver that Connects to a Video Source

As a result of the investigation into transmission of video signals across active telephone wiring and the system adopted for transmission of control signals, a general design for a transceiver was developed to connect between a video source and telephone wiring to perform the functions of:

1) shifting the frequency of the video signal from the channel supplied by the source to the channel used for transmission, 2) amplifying the video signal, 3) "balancing" the two leads of the video signal so that their voltages are nearly equal and opposite with respect to ground, and matching the impedance of the telephone wiring, 4) transmitting this signal on to the telephone network without disturbing low-frequency communication signals, simultaneously recovering the control signals fed to the wiring by the transceiver connected to the television, 5) downshifting the control signals to their original frequency, 6) using the resulting energy to recreate the original infrared pattern, and 7) connecting to a telephone jack while allowing for telephone devices to share the same jack without loading down the energy of the video signal.

FIG. 1 shows an arrangement of electronics for a transceiver 1 designed to implement these functions. This transceiver is described in the following paragraphs. The description discloses several optional design variations.

The transceiver 1 connects to the video source 2 to derive a signal. That signal is passed to RF converter 3, which translates the signal to the frequency band chosen for transmission over the wiring.

Fortunately, nearly all consumer video sources provide their signals in one of only two different ways. Some devices provide an unmodulated video signal containing no sound information from one port and an unmodulated audio signal from a second, separate port. Others supply a video signal, possibly including sound information, at either VHF channel 3 or 4, according to a switch set by the consumer. Most VCRs make their signal available in both forms.

Two alternative design options for RF converters are disclosed for transmission at a low VHF channel. These options have clear advantages over all other possible designs. One design derives the signals from the port that supplies a low VHF signal, hereinafter referred to as the "low VHF port." That design is described first. That description is followed by a description of the second design, which derives its signal from the port that supplies an unmodulated signal, hereinafter referred to as the "baseband" port.

Operating manuals for video sources that provide a VHF channel 3 or 4 signal instruct users to select the channel not used for local broadcasting. One of the two is always guaranteed to be free from broadcast interference in the U.S. This is because the U.S. FCC has allocated frequencies to ensure that no locality has broadcasting at both of two adjacent video channels, and has reserved the video broadcast bands strictly for television.

It follows that the low VHF port on a VCR is guaranteed to provide a low VHF signal that is not used for local broadcasting. This eliminates the need for RF conversion electronics and significantly reduces the expense of the device. Furthermore, a single design can suffice for every location in the country.

A possible drawback to this alternative is that of the interference problem, described earlier, caused by radiation of the transmitted signal from the wiring that leaks into televisions deriving signals from a separate source at VHF channel 3 or 4. To minimize radiation and thus alleviate this problem, the use of a special connecting cable and a variable amplifier are disclosed later on in the description of this transceiver.

The second design option for transmission at a low VHF channel calls for the signal to be derived in unmodulated form from the baseband port. This option has two significant advantages. One is that the low VHF port on VCRs is usually connected to a television receiver, while the baseband port on VCRs is almost always unused and open, making connection of the transceiver extremely easy.

The other advantage derives from a switch, usually referred to as the "TV/VCR" switch, that controls the output of the low VHF port on VCRs. The TV/VCR switch allows the VCR signal, created from a video tape or from a signal tuned in by the VCR tuner, to be sent out at VHF channel 3 or 4, or alternatively, it allows the signals input to the VCR to pass out the "low VHF" port at their original frequencies. Meanwhile, the VCR signal always exits the baseband port. This allows the local television to tune to either the input signals, or to the signal produced by the VCR, while the VCR signal exits the baseband port separately, available for transmission across the wiring to the remote television. Moreover, the "TV/VCR" switch usually responds to one of the controls on an accompanying infrared remote control transmitter.

If a low VHF frequency is chosen for transmission and the baseband port is chosen as the signal source, the RF converter 3 is obviously required. The converter inputs a video signal, and uses that signal to modulate a low VHF carrier signal, creating an equivalent video signal at a low VHF frequency. (If an audio signal is available, it would ordinarily make sense, of course, for the modulator to combine this signal together with the video according to the NTSC or an equivalent format, and then use the combined signal to modulate the carrier.) In order to achieve the economy provided by a single design that suffices for the entire U.S., one of two adjacent low VHF channels should be made available and set according to a user-controlled switch. (Theoretically, the switch could also be automatically controlled, using circuitry that detects the presence of broadcast energy to choose the empty channel.) A design for this modulator is not given because several designs are well known.

Several advantages accrue if the modulator is designed to operate at either VHF channel 5 or 6, instead of the other two available adjacent low VHF pairs: VHF 3/4, and VHF 2/3. First of all, the special problem of radiative energy from the wiring interfering with the signal provided by a separate video source to a nearby television will not occur. This is because consumer video sources seldom provide their video signal at VHF channel 5 or 6. Secondly, the television connected via the transceiver will more easily be able to combine the recovered signal together with a local video source, such as a cable converter, again because video sources almost always use VHF channels 2, 3, or 4. Finally, an advantage accrues from the fact that VHF channels 5 and 6 are not adjacent to any other channels. This means that when combining the telephone line signal with a signal from an antenna, the signal from the telephone line will never be adjacent to more than one broadcast signal. Because only expensive modulators confine their signals completely within their intended band, this reduces possibilities of interference.

The RF converter 3 is also required, of course, if a frequency below VHF channel 2 is used for transmission, independent of the port from which the video signal is derived. Unlike low VHF channels, however, channels below VHF 2 are not tunable by ordinary televisions, making RF conversion a requirement at the transceiver that connects to the television, shown later in FIG. 2. The RF conversions performed by the two transceivers must obviously coordinate in this case. Three systems for coordination between these conversion operations are disclosed following the description of the television transceiver.

After it is derived at or shifted to the channel used for transmission, the video signal is passed to an RF amplifier 4, which increases the energy level by a fixed factor. In order to increase the likelihood of success of transmission across all residences, amplification should be set to cause radiation that barely meets legal limits, unless a very high success rate can be achieved with a lesser setting.

A variation of this design calls for an RF amplifier 4 that allows the user variable control over the amplification level. This is valuable in situations where VHF 3 or 4 is used for transmission, because radiation from the wiring can cause interference at televisions connected to separate sources, as described earlier. it A variable reduction of signal level potentially enables a user to eliminate this interference while keeping signal level at the remote television high enough to generate an undegraded picture.

After amplification, the video signal follows the conductive path to a coupling network 5. This network 5 feeds the video signal to the telephone wiring, and allows the control signals from the television transceiver to pass from the wiring towards the control signal processing circuitry 6. (The process whereby control signals from an infrared transmitter are converted to electrical energy above voiceband and conducted on to the telephone line is included within the description of the television transceiver.) The network also performs the functions of balancing the energy of the video signal, matching the impedance of the video signal path to the impedance of the telephone wiring, blocking low-frequency telephone communication signals from the transceiver electronics, and blocking the flow of video signals towards the control signal processing circuitry 6. The network 5 does not block the flow of control signals towards the RF amplifier 4.

Figure 6:
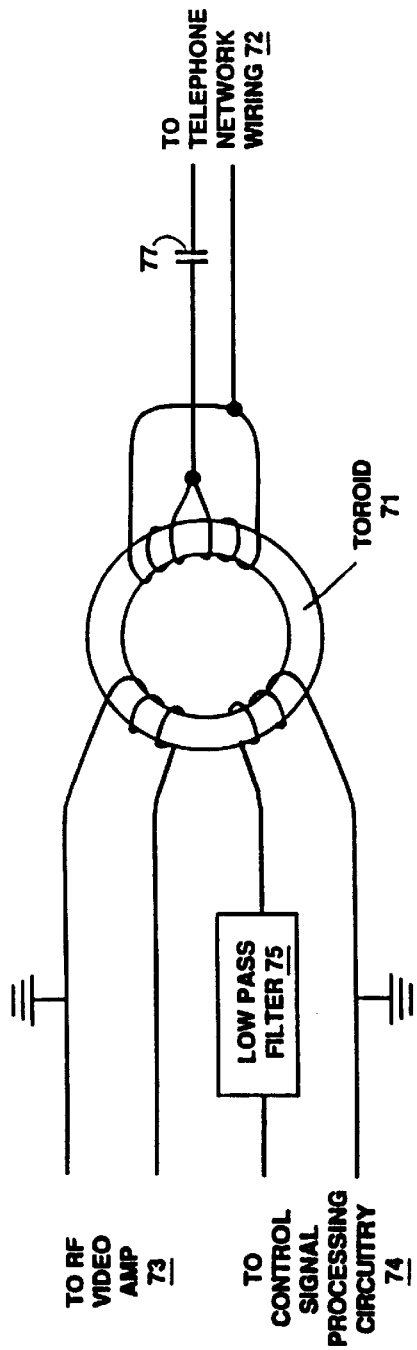
FIG. 6 shows the electronics used within the video source transceiver for coupling to an active telephone network.

The importance of these functions is described in the following paragraphs. The detailed electronic design of the preferred embodiment of this network is shown in FIG. 6 and is described in detail later on.

Balancing the video signal energy on the two leads of the wiring promotes cancellation of the two electromagnetic fields created by these leads, dramatically reducing radiation. The frequency of the input will have the biggest effect on the balance achieved by a given network design. Because the frequency will be known, the design can be tailored to produce a reliable balancing.

Balancing of the control signals, on the other hand, is not nearly as critical because the strength of those signals can be boosted high enough to guarantee quality transmission while limiting radiation to levels below legal or otherwise significant limits.

The impedance of the internal transceiver circuitry wiring is matched to the impedance of the telephone line at the video frequencies because transition from one medium to another is inefficient and wastes signal energy if impedance is not matched. This can be important in situations where the video signal energy is only marginally high enough to create a high quality picture. Impedance matching at the frequencies used by control signals is not important because of the excess power available for transmission of those signals.

Blocking low-frequency signals from transmission to the electronics of the transceiver prevents any interference with ordinary telephone communication signals. The blocking should render the connection and operation of the transceiver totally transparent to the functioning of low frequency telephone communications.

Blocking the flow of video energy to the control signal processing circuitry 6 allows that component to reliably recreate the original control signal without special expensive electronics. The video signal would ordinarily disrupt this processing because it has a very high energy level while passing through this network.

Note that the network 5 allows control signals to pass on to the RF amplifier 4. There is no need to block these signals because they will be at frequencies above baseband and RF amplifiers are commonly designed to terminate low power RF signals that are incident at their outputs. The amplifier thus provides isolation of the control signal from the video source as a side effect. If this intelligence could traverse the amplifier and transmit to the RF converter 3 or the video source 2, it would be similarly ignored, because these devices also commonly provide reverse isolation.

Figure 9:
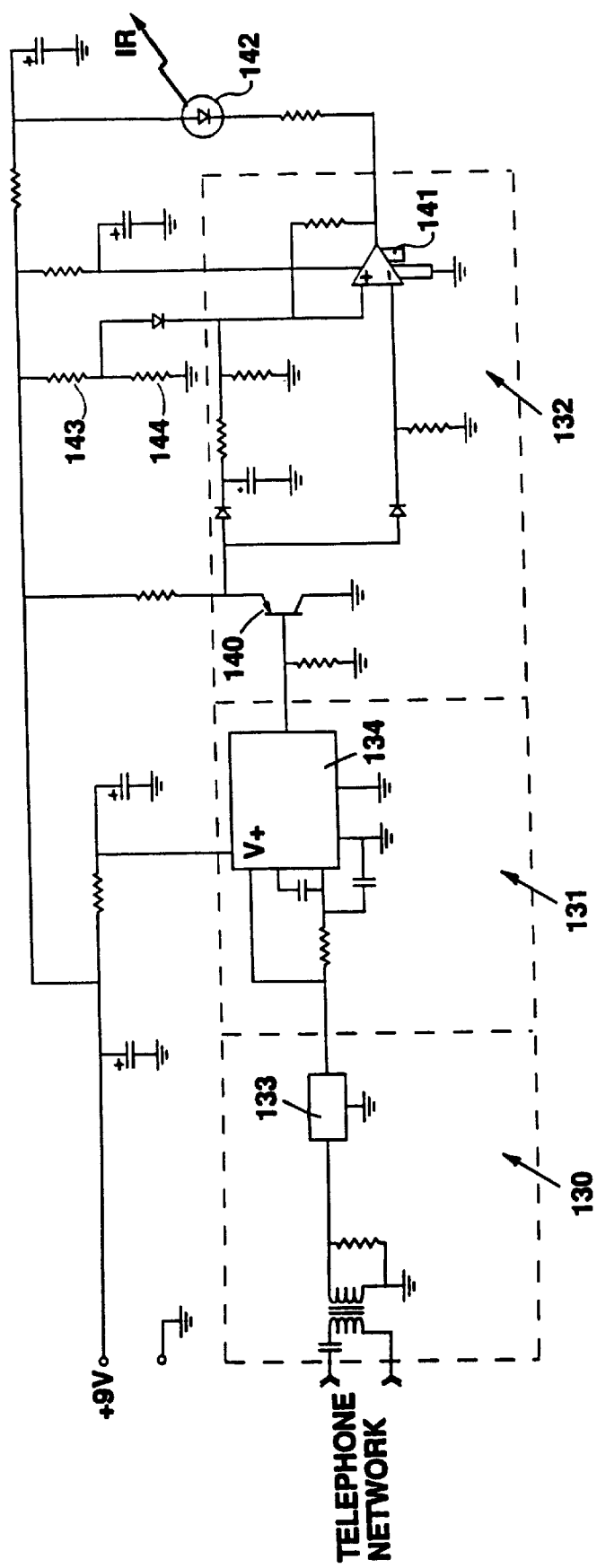
FIG. 9 shows the details of the circuitry that creates an infrared light pattern from an electrical signal above the telephone voiceband.

The function of the control signal processing circuitry 6 is to downshift the frequency of the control signals back to their original location at baseband, and to use the resulting energy to drive an infrared emitting bulb 7, recreating the original light pattern. This function completes the process of transmission of signals from an infrared transmitter over active telephone wiring, a function not heretofore a part of any commercial or consumer device. The preferred embodiment of the control signal circuitry 6 of the video source transceiver is shown in FIG. 9 and is described in detail later on.

If the video source transceiver is placed on top of the source to which it connects, which seems likely to be the most convenient placement, there will not be a line of sight path between the infrared bulb and the infrared sensitive pick up window on the source. This is not a problem if the infrared light can reflect off walls and retain its effectiveness, something that is known to be possible. To allow this convenient placement of the transmitter, the infrared transmission bulb should be driven at high power and with a wide beamwidth, in order to decrease the possibility of insufficient reflective energy. It may make sense to drive several bulbs oriented at different angles.

The transceiver 1 connects to the telephone network 10 via a connecting cord 12 terminated with a male RJ-11 plug, the standard plug used to connect to telephone jacks. This cord includes two special components: a touch tone switch 8, and a low pass filter 9. Also, the two conductors of the cord are systematically twisted about each other.

The touch tone switch 8 is an optional feature provided for coordination of this transceiver with other video source transceivers connected to the same network. Its function is described in detail later on. For the purposes of the current discussion, it can be assumed that the switch has no influence on signal flow across the cord 12 or on the operation of the other components. The other two features, the low pass filter 9 and the special nature of the conductors of the cord, are described in the following paragraphs.

As mentioned earlier, telephone devices that connect to a main transmission path via a short stretch of wiring can cause significant dissipation of RF signal energy. To allow equipment to remain connected at the ports shared by the transceiver without causing attenuation, the low-pass filter 9, consisting of two induction coils with low-pass properties, connects in series to the two conductors of the cord to offer a second port for connection of telephone equipment 11. This filter removes most high-frequency effects of both the equipment and the split in the wiring by presenting a high impedance to RF signals.

Twisting the conductors of the cord significantly reduces the energy that radiates from those conductors, beyond the reduction that derives from balancing the voltages. When used in combination with the low-pass filter, this feature leaves only the wiring connecting the jacks to the public telephone interface, and the wiring connecting telephone devices at uninvolved jacks as a source for significant radiation. (If the connecting wires are twisted, and uninvolved jacks are far from the main transmission path, very few radiation opportunities will remain.) This reduction is important for the case where a television receiving a signal from a separate video source encounters interference from radiation generated by the wiring at VHF channel 3 or 4.

Shielding of the conductors by a metallic conductor also will reduce radiation. This shielding is more effective if the conductor is connected to ground.

Description of the Transceiver that Connects to a Television Receiver

Based on the system adopted for transmitting infrared signals, and the requirements for conveniently supplying video signals to a television receiver, a general design for a transceiver was developed to connect between telephone wiring and a television receiver to perform the functions of:

1) receiving ambient infrared control signals, converting them to electrical energy, and boosting the frequency of this energy to a band that lies completely above the frequencies used for ordinary telephone communications, 2) feeding the control signal on to the telephone network without disturbing low-frequency communication signals, while simultaneously recovering video signals, 3) matching the impedance between the telephone wiring and the conductive path that receives the video signal, 4) converting, if necessary, the received video signal up to a channel that is tunable by a television and is not used for local broadcasting, and 5) connecting to a telephone jack while allowing for telephone devices to share the same jack without loading down the energy of video signals on the wiring.

Figure 2:
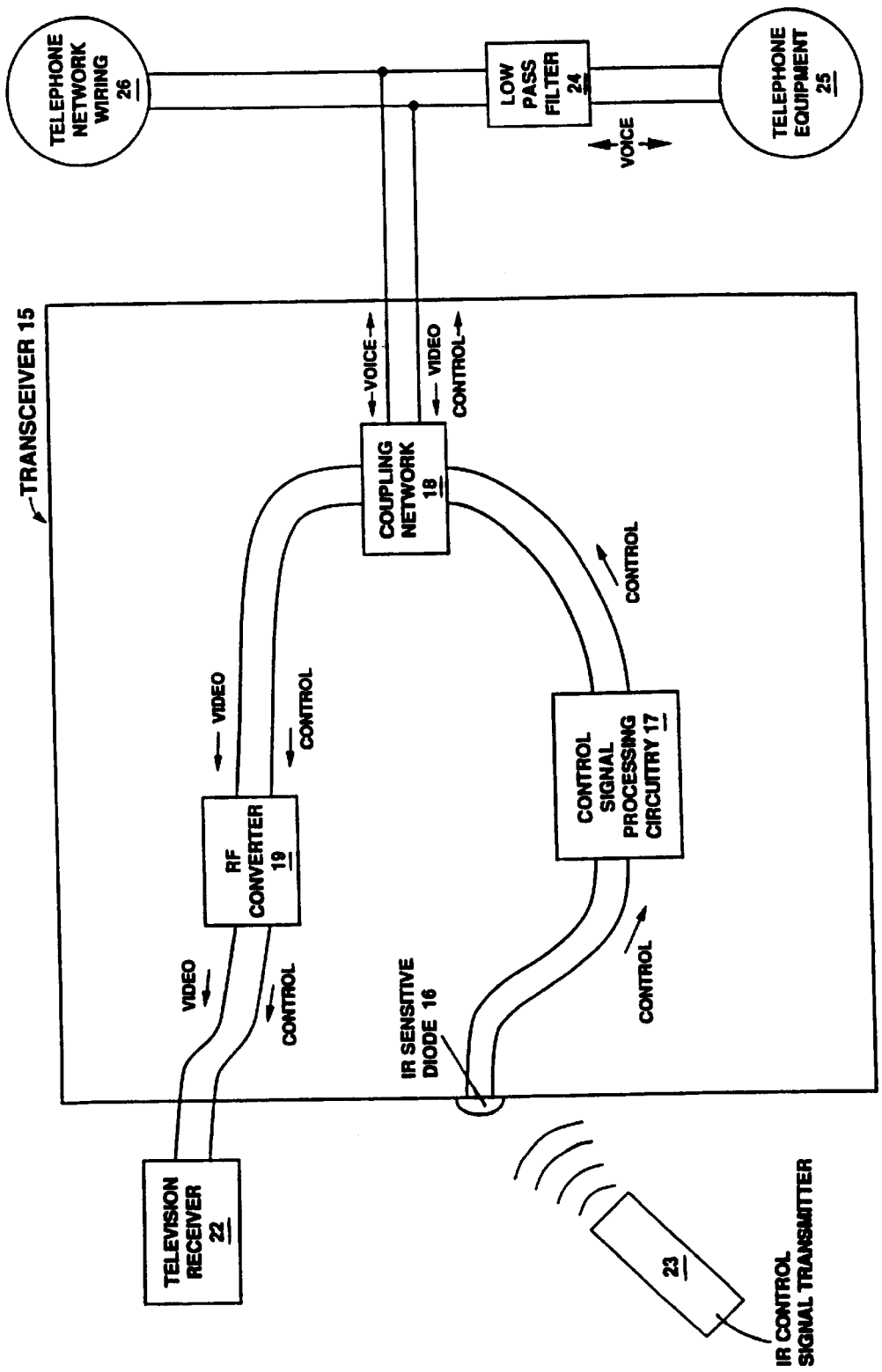
FIG. 2 is a block diagram that illustrates the fundamental components of the transceiver that connects to a television and how those components interact with one another.
Figure 4:
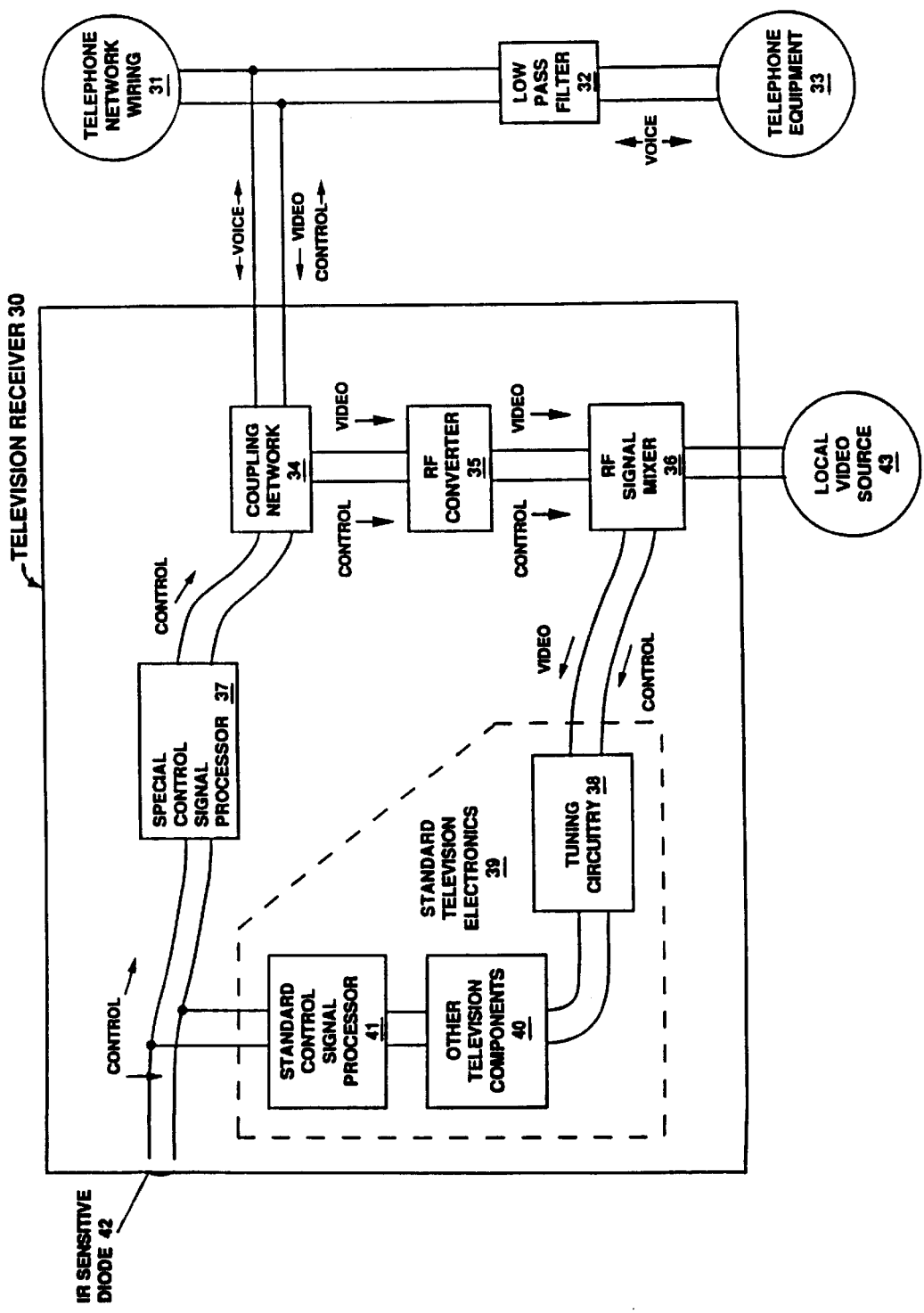
FIG. 4 is a block diagram showing how special components can be included within an ordinary television to provide for recovery of video signals from active telephone networks and for transmission of control signals onto those networks for reception by a cooperating transceiver.

FIG. 2 shows an arrangement of electronics for a transceiver 15 designed to implement these functions. This transceiver 15 is described in the following paragraphs. The description discloses several optional design variations.

Figure 8:
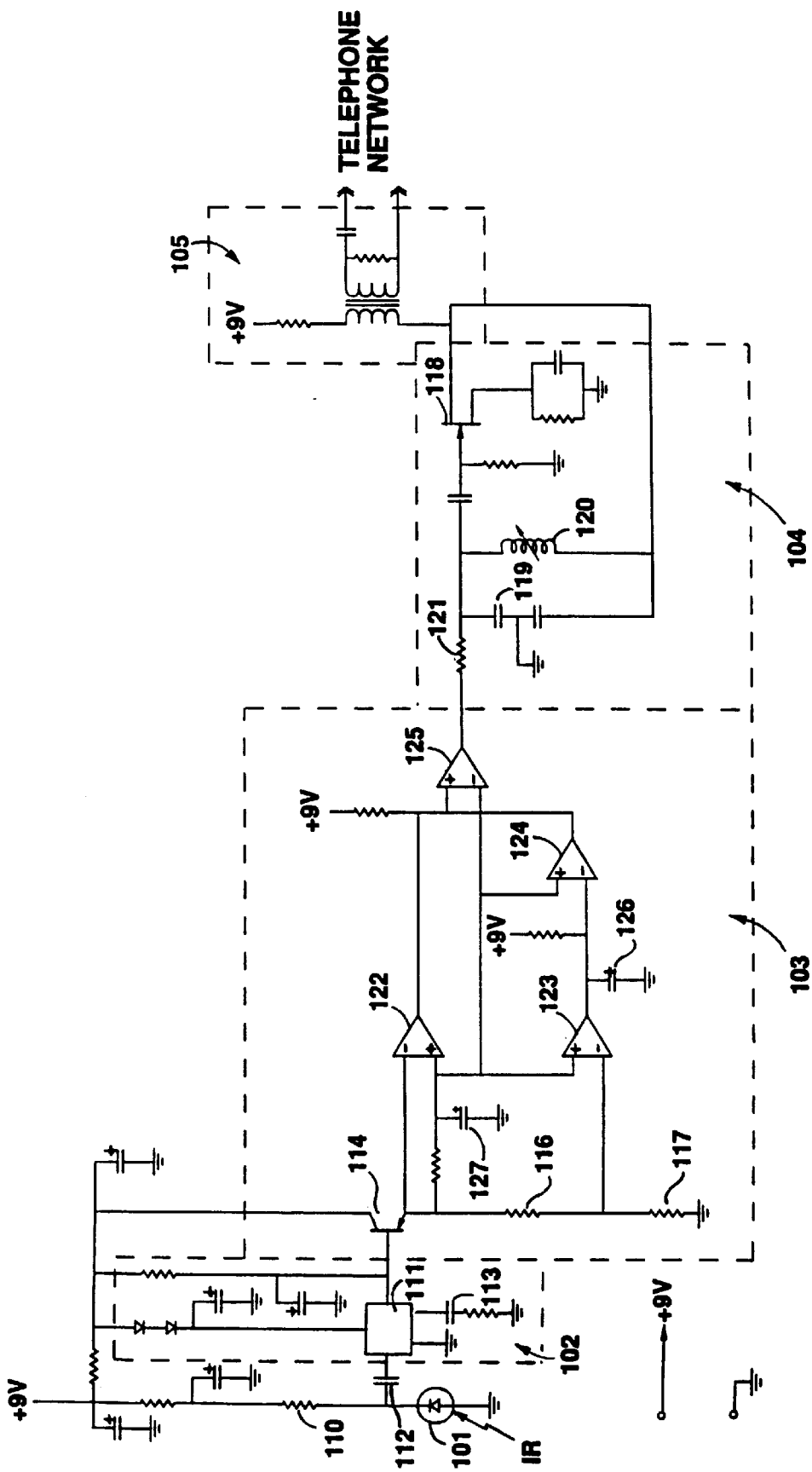
FIG. 8 shows the details of the circuitry that converts infrared light to electrical energy at frequencies above the telephone voiceband.

An infrared sensitive diode 16 reacts to control signals from an infrared control signal transmitter 23 to create the desired conversion to electrical energy. The resulting signal is passed to the control signal processing circuitry 17 which performs the translation to a frequency band above the telephone communications band. The preferred embodiment of this circuitry is shown in FIG. 8 and described in detail later on. The preferred embodiment calls for a transmission frequency centered at 10.7 Mhz.

Signals generated by the control signal processing circuitry 17 are passed to a coupling network 18. This network feeds the control signals to the telephone network wiring 26 and allows video signals to pass from the wiring along the conductive path leading towards the television receiver 22. The network also performs the functions of matching the impedance of the video signal path to that of the telephone wiring, blocking low-frequency signals from the transceiver electronics, blocking the diversion of video energy towards the control signal processing circuitry 17, and blocking higher harmonics of the control signal, but not the fundamental of this signal from transmission to the telephone wiring and from transmission along the conductive path leading towards the television 22.

Figure 7:
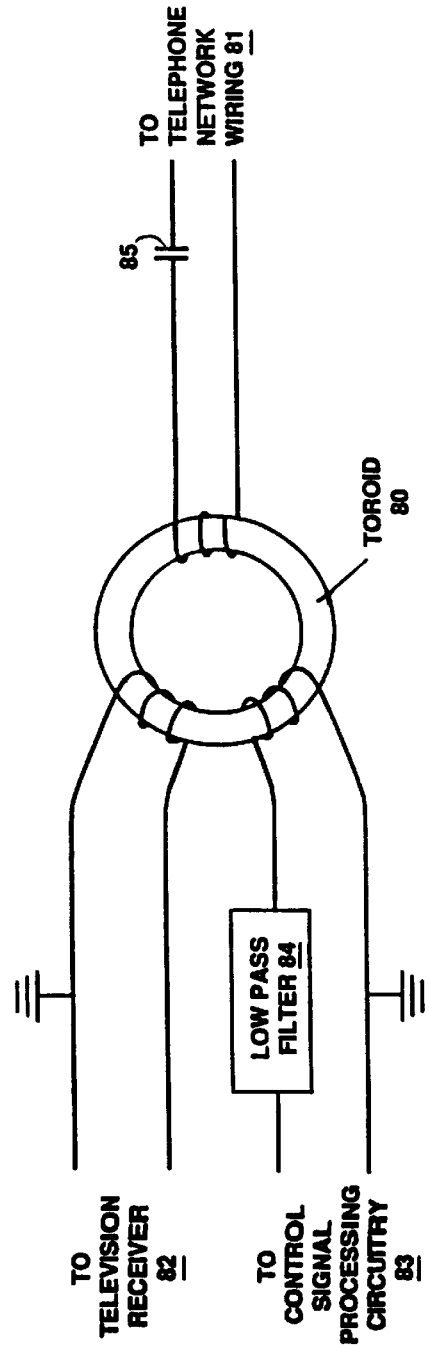
FIG. 7 shows the electronics used within the transceiver that connects to a television for coupling to an active telephone network.

The importance of these functions is described in the following paragraphs. The detailed electronic design of the preferred embodiment of this network is shown in FIG. 7 and is described in detail later on.

Impedance matching ensures an efficient transfer of energy from the telephone wiring to the electronics of the device. Just as in the case of the video source transceiver, the efficient transfer of video energy across this junction can be important in situations where the signal energy is only marginally sufficient to produce a high quality picture.

Blocking telephone and other low-frequency communications signals from transmission to the electronics of the transceiver prevents any interference with those signals and also prevents disturbance of the DC power supplied to telephone devices. The blocking should be such that it renders the functioning of these communications totally transparent to the connection and operation of the transceiver.

Blocking of video signal energy from transmission between the network 18 and the control signal processing circuitry 17 is important because it prevents the reduction of video signal energy by diversion along this path.

Blocking the harmonics, but not the fundamental, of the signal emerging from the control signal processing circuitry 17 is important because some of the harmonics may coincide with the frequencies used for transmission of video. Because they will transmit to the television 22 as well as to the telephone wiring, these harmonics can cause interference if they are of sufficient strength. No information is lost in this process because the information in the harmonics of a signal is completely redundant with the information in the signal fundamental.

Unless the energy level of the control signal is very high, there is no need to block the control signal from transmission across the network 18 towards the television receiver 22. This is because television receivers ignore energy outside the video channel to which they are tuned unless that energy is at a very high level. For example, televisions ignore energy at VHF channel 4 when they are tuned to VHF channel 5. Problems also do not occur when the RF converter 19 is required. In that event, the control signal is shifted in frequency along with the video signal, but it is rejected by the television tuner for the same reasons as before. Because the control signal signal cannot cause interference or other harm to the television transceiver, the isolation circuitry described by the Robbins patent, which blocks this intelligence from the television, is unnecessary.

Signals passing along the path from the network towards the television 22 encounter the RF converter 19. As mentioned earlier, if a low VHF channel is used for transmission, frequency conversion at the television end is not necessary and signals can transmit directly from the coupling network 18 to the television 22.

When channels below VHF 2 are used for transmission, the RF converter 19 converts the video signal to a channel that is tunable by ordinary televisions. Because of potential interference problems, this channel should be one that is not used by local broadcasting. (Interference could normally be avoided by connecting the transceiver via a shielded coaxial cable. Many older televisions, however, do not offer a shielded input port, and many modern televisions exhibit slight leakage from other available ports such as twin lead ports.)

Because the video source transceiver outputs video signals at the transmission frequency, and this transceiver 15, inputs signals at that frequency, the two units must obviously cooperate in their RF conversion designs. Three systems are disclosed herein for cooperation between the RF converters of the disclosed transceiver pair to transmit video at a channel below VHF 2. Under each of these systems, the signal is provided to the television 22 at one of two adjacent broadcast channels, according to a switch set by the user. In the U.S., this feature guarantees that the requirement of providing a signal at a channel not used for local broadcasting is fulfilled because, as described earlier, the U.S. FCC has ensured that one of two adjacent channels is always unused in a given locality. A complete description of each of these systems is presented in the next section.

The television transceiver connects to the telephone wiring network 26 via a cord terminated with a male RJ-11 plug. Just like the cord used for connection of the video source transceiver, this cord contains a low pass filter 24, which creates an isolated port that allows connection of telephone equipment 25 without loading down the video signal passing from the network to the transceiver.

Unlike the cord connecting the video source transceiver to the telephone wiring, it is not as critical to supply this transceiver with a cord whose conductors are twisted. That is because the level of the video energy traversing the cord will be much lower, and will generate less radiation.

Because the television to which this transceiver connects may have another source of video signals available, and because most televisions only have one port for input of signals at VHF frequencies, it may make sense to provide a switch that allows users to connect both sources and quickly choose between them. Because of the likelihood that no signals from the two sources contain energy at the same channel, any device or component that performs this function might also allow the addition of the two. Technology to achieve these signal combination options is well known.

Such a component, not shown in the drawings, could be an attachment that connected in series with the cable connecting to the television. It might be more convenient, however, to include this component as part of the transceiver. In that case, the transceiver would simply include a coaxial port for input of signals from a second source, and would be able to provide signals from either source, or the combination of the two, to the local television. Controls on the transceiver would allow the user to choose the composition of the signal provided to the television.

There is a possibility that, when receiving signals from a video source located relatively close by, this transceiver 15 may receive a signal whose energy level is too high for the television to which it is connected. In the event that the transceiver includes RF conversion circuitry, the solution is to ensure that this circuitry can manage high signal levels, and that a level within the range of most television receivers is provided at the output. When a low VHF channel is used for transmission and RF conversion circuitry is not required, one solution is to provide attenuation circuitry, set automatically or manually, that reduces the energy of the signal to a level within the dynamic range of ordinary televisions.

Systems for RF Conversion to Achieve Transmission below VHF Channel 2

As mentioned earlier, two RF conversion operations are required in order to transmit the video signal across the wiring at a channel below VHF 2. At the video source end, the transceiver must convert the signal from the frequency at which it is supplied to a band between 6 Mhz and 54 Mhz. The transceiver connected to the television must recover the signal from within this band and convert it to a channel tunable by ordinary television receivers. Three systems for cooperation between these conversion operations are described in the following paragraphs, along with their respective advantages and disadvantages.

Under each of the systems, the signal is provided to the television 22 at one of two adjacent broadcast channels, according to a switch set by the user. In the U.S., this feature guarantees that the requirement of providing a signal at a channel not used for local broadcasting is fulfilled because, as described earlier, the U.S. FCC has ensured that one of two adjacent channels is always unused in a given locality.

The unusual nature of the conversion operations, combined with the novelty of using these channels for a consumer video application, or for any video application other than the cable distribution function described earlier, make the resulting electronics a new consumer electronic development.

The systems are summarized by the chart in FIG. 3. The precise electronic details of the various converters are not given because technology to achieve these conversions is known, and would be within the ability of one of working skill in this field.

Under the first system, the video source transceiver derives its signal from a low VHF port and imparts a fixed downshift to produce one of two adjacent channels. Signals spanning 24 Mhz to 30 Mhz or 30 Mhz to 36 Mhz, for example, are produced from VHF channels 3 or 4 by a fixed downshift of 36 Mhz. In the final step of this system, the RF converter in the television transceiver imparts an equivalent fixed upshift, restoring the signal to its original channel for delivery to the television. The fixed downshifts mean that the choice of which of the two channels is actually used for transmission is determined by the setting on the video source that chooses between VHF channel 3 or 4.

(There are a few video sources that supply signals at VHF channels 2 or 3 instead of VHF channels 3 or 4. To account for these sources, the shifting should be designed to include bands covering at least 18 Mhz, rather than 12 Mhz.)

The advantage of this system is that the versatility already supplied by the low VHF port of the video source is used to ensure that the transmitted signal is supplied to the television at an unused channel. This enables the two RF converters to be designed to translate by a fixed amount, reducing manufacturing costs.

The second system calls for the RF converter in the video source transceiver to use the video signal from a baseband port to modulate a carrier to either one of two adjacent channels below VHF 2, according to a switch set by the user. (It would ordinarily make sense, of course, for the modulator to combine an audio signal, if available, together with the video according to the NTSC or an equivalent format, and then to modulate using this combined signal.) In cooperation with this conversion, the RF converter of the television transceiver again upconverts by a fixed amount. If the modulation created the channels spanning either 24 Mhz to 30 Mhz or 30 Mhz to 36 Mhz, for example, an upshift of 36 Mhz would produce VHF channels 3 or 4, an upshift of 52 Mhz would produce VHF channels 5 or 6, and an upshift of 150 Mhz would produce VHF channels 7 or 8.

The primary advantages of this design over the first are those advantages, described earlier, that accrue to designs that derive signals from the baseband port of the video source. There is also a convenience in that inexpensive modulation ICs are available that provide much of the circuitry necessary to build video modulators with options for one of two carriers in the 10 Mhz to 100 Mhz range. Finally, being able to choose adjacent VHF channel pairs other than VHF channels 3 or 4 allows combination of the signal passed to the television with signals from most common video sources.

Two variations to the second system are now disclosed. In the first variation, the switch will be automatically controlled. It will rely on circuitry that samples the telephone line to detect the presence of broadcast energy at either of the two channels used to provide the signal to the television. (Broadcast energy will be on the telephone line because it acts as an antenna to some extent.) It will set the RF converter in the video source transceiver to provide a transmission frequency so as to ensure that the channel ultimately presented to the television receiver will be one unused for local broadcast.

In the second variation, the RF converter in the video source transceiver will simultaneously provide the video signal at both of the two adjacent channels below VHF 2, so that when the television transceiver converts the 12 Mhz band spanning these channels, it produces signals at both of the two adjacent tunable channels.

The third system also calls for the video source transceiver to derive its signal from the baseband port, but it includes an RF converter that has only a single carrier which modulates the signal to a single fixed channel that is used for transmission. The RF converter in the television transceiver then performs either one of two upward conversions, according to a switch set by the user, resulting in one of two adjacent low VHF channels. If the transmission channel spanned 24 Mhz to 30 Mhz, for example, upshifts of 36 Mhz and 42 Mhz would produce VHF channels 3 and 4, and upshifts of 52 Mhz and 58 Mhz would produce VHF channels 5 and 6.

In a variation of this strategy the RF conversion component of the television transceiver allows continuously variable manual tuning, in place of two fixed upshift conversions. This tuning must, of course, allow the signal presented to the television to span two consecutive channels. The provision of manual tuning reduces the precision required for both converters, resulting in a certain economy.

Like the second design, the two variations of the third design also enjoy the advantages of baseband input, and the advantage of being able to output adjacent VHF frequencies other than VHF 3 and 4. The main advantage over the second design is that the single optimal sub-VHF 2 channel, in terms of radiation, attenuation, interference from broadcast sources, legal restrictions, and expense of conversion electronics, can be chosen.

Because of these advantages, and because transmission over channels below VHF 2 affords reliability which is of enormous importance in consumer products, this third system is the preferred embodiment. Furthermore, the fixed and not the variable tuning is preferred because of the importance of convenience in consumer products. The preferred channel spans from 24 to 30 Mhz because there is a liberalization of U.S. FCC radiation restrictions below 30 Mhz, and because the conversion electronics are slightly more expensive when lower-frequencies are used. Finally, it is preferred to present the signal to the television at either VHF 5 or 6, because of the advantages of combining those channels with broadcast signals or other video sources.

(These preferences may change as a result of data not currently available to the inventors such as, specifically but not exclusively, information regarding the frequency, strength, and location of RF sources throughout the U.S. that may provide interference at channels below VHF 2.)

Two further variations to the third system are now disclosed. In the first of these, the switch will be automatically controlled. It will rely on circuitry to detect the presence of broadcast energy, to set the RF converter of television transceiver to convert the transmitted video energy to the channel unused for local broadcast. In the second variation, the RF converter of the television transceiver will simultaneously provide the video signal at both of the two adjacent tunable channels.

Description of the Special Television Receiver

The transceiver pair disclosed above provides an ability to view and control a video source at a remotely located television. A significant economy can be achieved, however, if the function of the disclosed television transceiver is internalized in the television electronics.

A special television 30, shown in Figure, provides such a combination. This television is intended to cooperate with the video source transceiver described above. It comes equipped with a cord that includes a low pass filter 32, similar to those used with the transceivers described earlier, for allowing telephone equipment 33 to share the same jack without loading down video signals on the wiring.

The television includes an IR sensitive diode 42, for converting infrared signals into electrical signals. These signals are passed to the special control signal processing circuitry 37 and the standard control signal processing circuitry 41. The standard circuitry 41 reacts to these signals to execute control over television operations in the ordinary manner. The special control signal processing circuitry 37 translates the electrical version of the control signals to a frequency band above the highest frequency used for ordinary telephone communications, and passes them to the coupling network 34.

The functions performed by the special control signal processing circuitry 37 are the same functions performed by the control signal processing component included in the transceiver, described earlier, that connects to the television. The preferred embodiment of the circuitry is also the same. This embodiment is shown in FIG. 8 and is described later on.

The coupling network 34 allows the control signals to pass to the telephone network wiring 31 and video signals to transmit from the wiring along the conductive path leading towards the RF converter 35. The network 34 also performs the important functions of matching the impedance of the conductive path leading to the RF converter to the impedance of the telephone wiring, blocking low-frequency signals from the television electronics, blocking the flow of video signals towards the special control signal processing circuitry 37, and blocking harmonics of the control signal, but not the fundamental of this signal from the telephone line and the conductive path leading towards the RF converter 35.

The functions performed by this network are the same functions performed by the coupling network included in the television transceiver described earlier. An explanation of the importance of these functions was included in the description of that device. The preferred embodiment of the network used here is also the same. This embodiment is shown in FIG. 7 and described later on.

Both the video and RF control signals pass from the coupling network 34 to the RF converter 35. That component will convert the video signal to a channel that is tunable by ordinary television tuning electronics. If a low VHF channel is used for transmission across the wiring, however, ordinary television tuners can tune to the transmitted signal and this component is not necessary.

Signals emerging from the RF converter 35 transmit to the RF signal combiner 36. (If the RF converter 35 is not needed, signals flow directly from the coupling network 34 to this combiner.) The RF combiner 36 will accept video signals from a local video source 43 if one is available. It will add signals from the two sources, or will choose the signals from one source or the other to pass along to the tuning section 38. The final composition of the signals passed to the tuning section 38 will be set by manual controls on the television 30 or by infrared control signals received by the IR sensitive diode 42.

The RF converter 35 disclosed herein can cooperate with the RF converter of the video source transceiver using one of the three alternative systems, described earlier, for cooperation between RF conversion components at the two ends of the communication path. The RF converter 35 included in the television will simply perform the same functions as the RF converter of the television transceiver described earlier, while the RF converter in the video signal transceiver will perform the corresponding conversion.

A variation of the third system for cooperation between converters is now disclosed for the case of the special television receiver 30. Under this variation, the RF converter 35 demodulates the video signal it receives, and injects that signal into the television at the point where it ordinarily expects demodulated signals. (The demodulated signal will not go into the combiner in this case, eliminating the need for that component. Signals from a local video source 43 will pass to the tuner without combination.) This variation liberates the converter from providing a signal at either one of two adjacent channels, and might be less expensive, overall, than the alternative.

Note that the RF converter 35 is not necessary if the television tuner 38 can tune to signals below VHF channel 2. This converter is offered as an alternative to providing the television with a special tuner because it may be less expensive to adapt the design of an ordinary television by adding this simple component.

In the preferred embodiment, the video signal transmits across the wiring at a frequency below VHF channel 2, and the RF converter is required because the television tuning section 38 tunes in only the ordinarily tunable channels. A channel below VHF 2 is preferred because of the decreased probability of picture degradation, and the RF converter is preferred because the inventors believe that it is less expensive to adapt the design of an ordinary television by adding a converter.

A transmission channel spanning 24 Mhz to 30 Mhz is preferred, and it is preferred that the RF converter of the television convert that channel upwards by either 52 Mhz or 58 Mhz to VHF channels 5 or 6, according to a switch setting on the television, or a command from the infrared controller. This embodiment follows the preferred system, presented earlier, for coordination between the RF converter of the video source transceiver and the RF converter of the television transceiver. The justifications used earlier also apply to this case. The option of demodulating the video signal is not currently preferred because the expense of this option is not clear.

Television 30 is novel in the following three respects. First, it connects to active telephone networks, without causing interference, to derive video signals, in addition to the video signals it derives from other sources. Secondly, in addition to detecting infrared signals for the purposes of controlling television functions, it converts these signals to electrical RF energy, and passes them on to the telephone line for controlling the video source in cooperation with another device. Finally, it is able to tune to signals at channels below VHF 2.

When the television 30 cooperates with the video source transceiver 1 described above, they allow the user to watch and control a video source from a remote location. To further increase the usefulness of this combination without significant extra cost, a unique combination of this pair of devices with a special piece of known technology is disclosed in the following two paragraphs.

To control the video source from the area wherein the special television receiver 30 is located, the infrared transmitter unit that controls that source must ordinarily be available at that location. This is not always convenient, because this unit is obviously often required at the location of the video source. If the television 30 is provided with its own infrared controller, inclusion of the command set of the video source controller as a subset of the available commands significantly increases the convenience of the system without significant extra cost.

Recently, infrared control units with large command sets that include those of many different controllers have become available, as have other units that have the ability to learn the command sets from virtually any other controller. The novel combination disclosed here adds a similar universal controller together with the disclosed cooperating television 30 and transceiver 1. This will significantly increase the usefulness of that pair of devices.

Systems for Avoiding Interference from Broadcast Sources

The signals transmitted by the devices disclosed above travel from source to receiver via conduction across telephone wiring. A potential problem of this technique, described earlier, is that RF broadcast energy from nearby sources can be received by the wiring and interfere with the signal of interest. Under the design option where the video signals transmit at a low VHF channel, the devices provide signals at a channel unused by any local service. This protection is not available when the video signals transmit at frequencies below VHF channel 2. The following factors, however, make the possibility of interference unlikely:

a) The signal-to-noise ratio required for a quality video picture, approximately 40 dB, is relatively low. Interfering signals must have energy levels within 40 dB of the signal of interest to visibly degrade a picture.

b) The signal of interest is conducted directly on to the wiring. The interfering signal must be received by the wiring acting as an antenna, a much less efficient method of creating conductive energy.

c) The ability of the wiring to receive broadcast energy decreases with decreasing frequency.

d) The level of the signal of interest can be boosted to reduce the potential of interference. (Because of legal and technological constraints, however, there are limits to the level to which this energy can be boosted.)

Despite these factors, tests have indicated that interference can occur. Three methods for avoiding interference problems are discussed below.

a) One can choose a frequency band that is less likely to be used by many transmitters operating at high power near residential areas. This strategy requires a survey of frequency allocations and broadcasting patterns. Preliminary investigation by the inventors revealed that amateur radio is allocated narrow bands at 7 Mhz, 14 Mhz, 21 Mhz, and 28 Mhz, conveniently leaving gaps of 7 Mhz—just right for video.

b) The video source transceiver can simultaneously transmit its signal over two frequency bands, and the signal that encounters less interference can be chosen, at the television end, to provide the picture.

In the case of the cooperating transceiver pair, the video source transceiver simultaneously transmits the same signal over two different and non-overlapping channels below VHF channel 2. The RF converter of the transceiver that connects to the television chooses, according to a manual control or an automatic process, to accept one of the two channels, converting the energy within that channel to a tunable frequency unused for local broadcast. (Circuitry to automatically choose the less "noisy" channel would have to include means to detect the presence of broadcast energy within each of the two channels.)

In the case of the special television that cooperates with the video source transceiver and includes a special RF converter, that converter performs the same functions as the converter in the television transceiver. Under the design option wherein the television tuner can tune directly to signals below VHF channel 2 (and a converter is not involved) the tuner simply tunes to one channel or another.

c) Because the information at the edges of an NTSC video signal is redundant, these edges can be filtered out before presentation to a television, removing any interfering energy at those edges. Specifically, the first 1.25 Mhz in an ordinary NTSC channel, known as the vestigial side band, can be filtered out before presentation to the television. This will reduce the video bandwidth from 5.75 Mhz to 4.5 Mhz, reducing opportunities for interference. In the event that research shows that this causes some degradation of picture quality, the vestigial side band can be recreated free from interference within the shielded television transceiver, using known techniques.

The upper 0.25 Mhz of the full 5.75 Mhz video signal can also be filtered without significant reduction in picture quality. Trimming this energy, however, will remove the audio information, which is located immediately above the video information. The solution is to transmit the audio signal at a different frequency, converting that signal to its proper place before presentation to the television.

Systems for Simultaneous Transmission of a Second Video Signal

A video source transceiver connecting a second source to the same residential wiring network obviously has to transmit its signal at a different frequency in order to operate simultaneously with the first source. Ideally, this transceiver cooperates with the television transceiver unit without requiring any design changes to that transceiver. That allows the most economical design for the primary transceiver pair, and still allows expansion of the system to include a second source.

If low VHF channels are used for transmission, design of the second video source transceiver is straightforward. That transceiver simply transmits its signal at one of a second pair of adjacent low VHF channels. If, for example, the primary video source transceiver uses VHF channel 5 or 6, the secondary transceiver could use VHF channel 2 or 3. The television transceiver described earlier will supply both signals to the television receiver without any design changes.

If the primary transmitter uses a channel below VHF 2, and the secondary transceiver uses a low VHF channel, a slight alteration in the design of the transceiver that connects to the television is required. The alteration calls for an extra signal path to the television that bypasses the RF converter. That path includes the unshifted low VHF signals which could be easily combined with the signal that was converted up by the RF converter. The channel generated by the RF converter, of course, will have to be different from the channel used for transmission of the second source.

Things are more complicated when both video signals transmit at channels below VHF 2 because the television transceiver must convert a second signal to a second tunable channel that is not used for local broadcasting. The shift in frequency required by the second signal, moreover, may not necessarily be the same as that required by the first signal. The largest problem, however, may be finding an extra 6 Mhz that is free from broadcast source interference.

Extra transceivers that transmit video over the same channel as the primary transceiver can be connected, of course, as long as a viewer can disable all but one of the resulting group of connected transceivers. In the following paragraphs, two designs are disclosed for systems that allows a user to quickly, conveniently, and remotely activate exactly one of several connected video source transceivers transmitting at the same frequency.

The first design calls for the signal from all but one of the transceivers to be blocked from transmission on to the wiring. The blocking is accomplished by the touch tone switch 8 shown in FIG. 1. This switch connects on the cord between the transceiver and the telephone jack, and contains a low pass filter, or other means that completely block signals above a frequency that is below the frequencies used for video transmission. It has two settings, one of which enables the filter and the other which defeats it. The switch reacts to the DTMF (dual tone multi frequency) touch tones commonly created by telephones, allowing users to conveniently select the active source from among the several connected. Any logical command system will suffice. The electronic details of this switch are not shown because RF filters and touch tone controls are well known.

The second design calls for each of the video source transceivers that transmit at the same frequency to derive its AC power via powerline switches similar to those built by the X-10 Corporation. These switches connect between power cords and AC outlets. They detect high frequency control signals fed onto the wiring by a remote device, and respond by blocking or enabling power to pass along the power cord to the connected electrical device. This allows one to remotely control the AC power to any device in a residence via control signals sent through the AC wiring. Thus, a user could conveniently select one of many sources sharing a transmission frequency by activiating the AC power for the transceiver of that source and none of the others.

Because the first design uses ordinary touch tone telephones to the send signals that establish the identity of the active transceiver, it is preferred over the second design, which requires special transmitters to send those signals.

Description of the Adaptor for Central Telephone Switching Devices

As mentioned in the introduction, a reliable conductive path is not always available in residences where each jack is wired directly to a central electronic interface unit that connects to the public telephone system. Because of the topology of these networks, potential conductive paths from one jack to another will always traverse this unit, where their continuity is likely to be broken.

Figure 5:
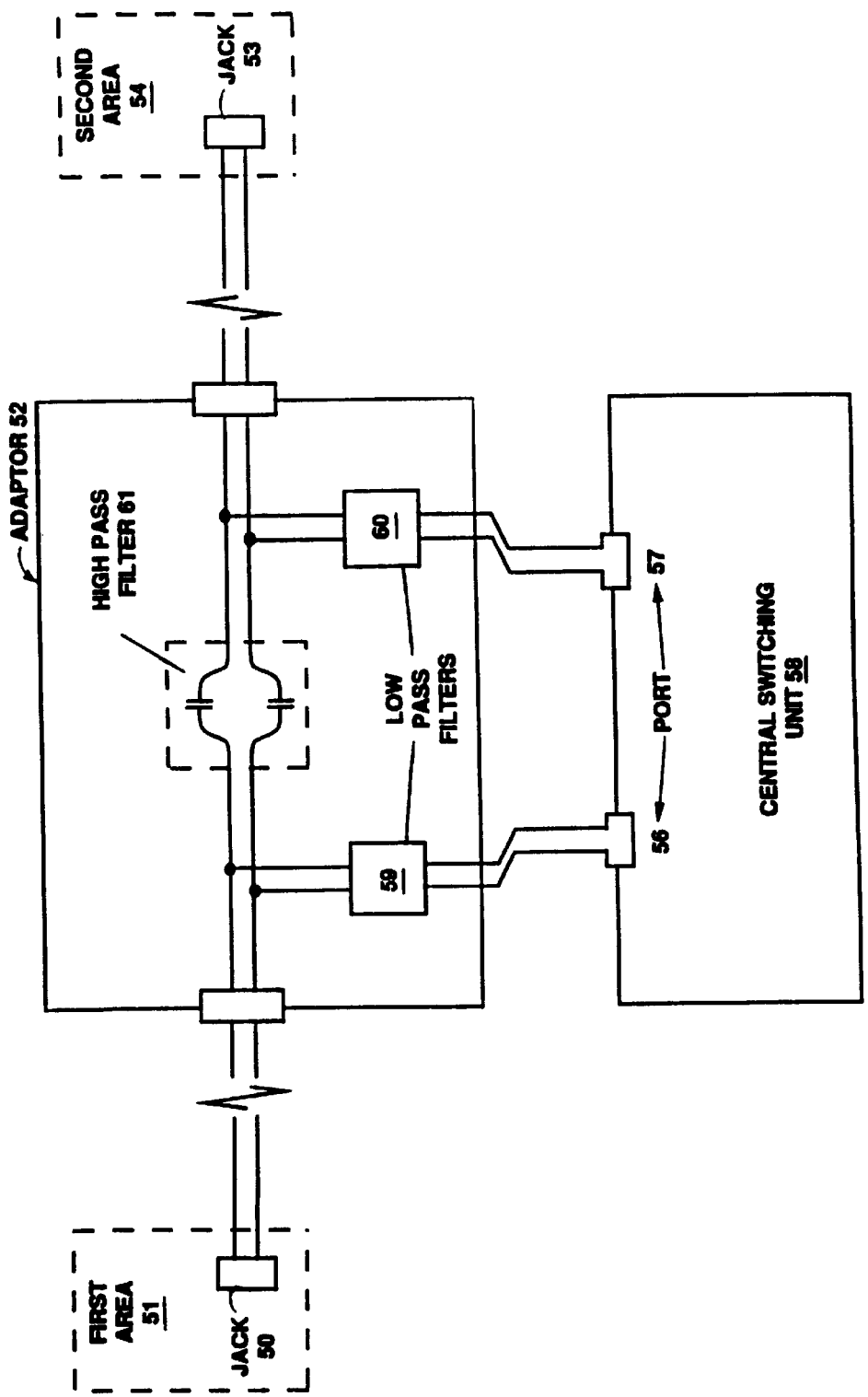
FIG. 5 shows the electronics of an adaptor designed to allow transmission of RF energy across telephone networks that include a central switching unit.

To allow the disclosed devices to operate on such a network, an inexpensive adaptor 52 is disclosed. This adaptor is shown in FIG. 5.

Normally, the wiring leading from the jack 50 in the first area 51 would connect to the port 56 on the electronic switching unit 58 dedicated to the first area. Similarly, the wiring leading from the jack 53 in the second area 54 would connect to the port 57 on the unit dedicated to the second area.

The adaptor 58 reroutes these connections through a pair of low pass filters 59 and 60. These block the transmission of high frequency signals away from the switching unit, eliminating attenuation. The filtering can be achieved by the same pair of inductors disclosed earlier that achieve low pass filtering of any telephone equipment that shares a jack with either of the two cooperating transceivers.

The high pass filter 61 connects the paths leading from the first area 51 to the second area 54 at high frequencies, completing the conductive path for video and control signals between the associated jacks. Transmission of low-frequency energy across this path is blocked, maintaining separation of the telephone and other low-frequency communication between each jack and the switching unit. In the preferred embodiment, the high pass filtering is achieved by a pair of 100 pF capacitors, connected as shown.

The problem of inadequate video signal energy in the area where the television is located was described earlier. Because the disclosed adaptor offers access to the signal near the midpoint of its transmission path, it offers a new solution to this problem. The solution, not shown in the drawings, calls for an amplifier to accompany the adaptor. A path leading from a video source could be passed through this amplifier just before connection to the adaptor. In this way, part of the total amplification required could be imparted at the video source transceiver, and the other part at the switching unit. This would reduce the peak signal power at any point for a given level of total amplification, thus reducing the maximum level of radiation.

For systems that also transmit control signals, a bypass around the amplifier for transmission of these signals would have to be made. The bypass would simply be a conductive path around the amplifier including a filter to block video signals. Similarly, the input to the amplifier would require a filter to block out control signals.

Because the technology disclosed herein is not limited to residential networks, and because "star" wiring configurations including a central switching unit are very common among telephone networks installed in commercial buildings, including but not limited to offices and hotels, the disclosed adaptor has the important function of enabling those installations to benefit from this video transmission technique.

Details of the Coupling Network Circuitry

The earlier descriptions of the cooperating transceivers referred to coupling network circuitry in functional terms. The preferred embodiment of this circuitry is now presented in detail.

FIG. 6 shows the preferred embodiment of the coupling network of the video source transceiver. The principal element of this network is a transformer wound on a toroid core 71. There are three isolated windings corresponding to the ports leading to the telephone network wiring 72, the video signal amplifier 73, and the control signal processing circuitry 74. The special winding method shown for the phone line port serves to maximize its balance.

The low pass filter 75 on the port leading to the control signal processing circuitry 74 blocks signals above the frequency used for control signals. This blocks the video energy, preventing that energy from disturbing the processing of the control signals, and prevents loading of video signals on the telephone line.

There are different numbers of windings on the toroid core for the three different ports. (The number of windings shown are only for purposes of illustration.) The turns ratios determine the impedance matching between the telephone port and the other two ports. Different ratios are needed because the video port and the control signal port have different impedances at different frequencies.

The impedance matching for video signals is governed strictly by the turns ratio between the telephone port and the video port. It is independent of the windings on the IR port because the filter 75 prevents video energy from flowing towards that port.

The capacitor 77 serves as a high pass filter to block and present a high impedance to DC and low-frequency energy, preventing any disturbance of ordinary telephone communications at those frequencies.

FIG. 7 shows the preferred embodiment of the coupling network of the television transceiver. The principal element of this network is again a transformer wound on a toroid core 80. There are three isolated windings corresponding to the ports leading to the telephone line 81, the television receiver 82, and the control signal processing circuitry 83. The special winding method for the telephone line shown earlier is not necessary because maximum balance is not as important due to the lower energy level of the video signals at this end.

The low pass filter 84 on the control signal port passes the 10.7 Mhz signal but blocks harmonics of 10.7 Mhz. These harmonics, whose intelligence is redundant with the intelligence in the fundamental, could potentially interfere with the video signals. The resulting control signal passes on to both the telephone line and to the television. To prevent loading down the video signal, the filter 84 also blocks video signals from the control signal port.

There are different numbers of windings on the toroid core 80 for the three ports. (The number of windings shown are only for purposes of illustration.) The turns ratios determine impedance matching. Because the level of the control signal is high enough to easily survive the influence of any impedance mismatch, the impedance of the ports need only be properly matched at video frequencies, and only between the telephone line port and the video port.

The capacitor 85 serves as a high pass filter to block DC and low-frequency energy and prevent any disturbance with ordinary telephone communications at those frequencies.

It should be understood that various changes and modifications to the preferred embodiment of the coupling network described above will be apparent to those skilled in the art. For example, other winding configurations are possible, including but not limited to broadband multifilar configurations. These and other changes can be made without departing from the spirit and scope of the invention.

Details of the Control Signal Processing Circuitry

The earlier descriptions of the cooperating transceivers referred to control signal processing circuitry in functional terms. The preferred embodiment of this circuitry is now presented in detail.

FIG. 8 shows the details of the control signal processing circuitry in the television transceiver that detects infrared signals, and translates them to RF energy. This circuitry consists of a photodiode 101, a high-gain amplifier stage 102, a thresholded zero crossing detector 103, and a gated oscillator 104. These elements are arranged to produce a modulated RF carrier whose envelope is a replica of the infrared signal waveform.

The RF carrier is coupled to the telephone line through the coupling network 105. The coupling network shown in FIG. 8 is designed only to feed control signals on to the network. The coupling network of the preferred embodiment, which is designed to include recovery of video signals from the wiring, is shown in FIG. 7 and was described earlier.

Photodiode 101 functions as a current source with current proportional to the intensity of incident light within its spectral passband. This photocurrent is converted to a voltage by resistor 110 and amplified by integrated circuit 111. Capacitors 112 and 113 reduce the low frequency gain of the amplifier stage to render the receiver insensitive to ambient light sources, such as sunlight or AC powered interior lighting with a nominal 120 Hz flicker rate. Transistor 114 buffers and level-shifts the output of the amplifier, and passes the signal to the zero crossing detector section 103.

The output of the detector section 103 is a bi-level waveform that corresponds to the received infrared signal. This output is high when the input signal exceeds its long term average, and low otherwise. Noise effects are suppressed by disabling the bi-level signal except when the excursions of the input signal exceed a fixed threshold. The bi-level waveform is fed to the oscillation section to enable or disable the RF carrier, thus generating the desired AM signal at an RF frequency.

The output of comparator 122 is set high when the optical flux is greater than the long term average, which is formed using an averaging time of 100 msec, as determined by capacitor 127.

The noise condition is detected by comparator 123. It sets its output low when the input signal is a fixed amount greater than the long term average. This threshold is set so that noise will not cause it to be exceeded. The threshold may be changed as desired by altering the ratio of resistors 116 and 117 to provide different levels of noise suppression.

Capacitor 126 causes a low output from comparator 123 to remain low for a fixed period. Comparator 124 inverts this output, and comparator 125 is used to merge that output with the the output from comparator 122. In this manner, the output exits to the oscillator section without interruption when a genuine signal is present, and dies off quickly when the signal disappears.

In the oscillator section, transistor 118 is wired as a Colpitts oscillator with frequency determined primarily by capacitor 119 and variable inductor 120. In the preferred embodiment, this frequency is selected to be 10.7 Mhz because of the good availability of tuning components at this frequency. When the oscillator is disabled by comparator 125, an idle current of several milliamps is drawn through the inductor and resistor 121. This idle current provides rapid turn-on of the oscillator within a microsecond when the oscillator is activated by comparator 125 going to a high impedance state at its open-collector output.

FIG. 9 shows the control signal processing circuitry in the video source transceiver that uses control signals recovered from the network to recreate the infrared pattern detected by the television transceiver. The circuitry consists of an RF amplifier/detector 131, threshold/driver circuitry 132, and an output LED 142.

The control signals are recovered from the telephone line by the telephone coupling network 130. The coupling network shown in FIG. 9 is designed only to recover control signals from the network. The coupling network of the preferred embodiment, which is designed to include transmission of video signals onto the network, is shown in FIG. 6 and was described earlier.

Signals recovered from the network pass through RF filter 133. This filter, which is part of the coupling network, is a ceramic filter with bandpass centered at 10.7 Mhz and a bandwidth of 280 khz. This matches the characteristics of the RF signals generated by the infrared signal processing circuitry described above.

The RF amplifier/detector 131 amplifies and envelope detects the signals that pass through the filter. In the preferred embodiment, this function is performed by an integrated circuit 134 of type 3089, which is commonly used as an IF amplifier in commercial FM radios. The detected output is logarithmically related to the amplitude of the RF input signal.

The detected output is buffered by Darlington transistor 140. Comparator 141 provides threshold detection by comparing the instantaneous envelope of the detected signal to the peak envelope of the detected signal. The comparator turns on LED 142 whenever the envelope exceeds a fixed percentage of the peak. Resistors 143 and 144 set the threshold of the transmitter; the LED will not be driven on unless a minimum signal level at the input of the integrated circuit 134 is exceeded.

While the foregoing has been provided with reference to one or more preferred embodiments, various changes within the spirit of the invention will be apparent to those of working skill in this technical field. Thus, the invention should be considered as limited only by the scope of the appended claims.

What is claimed is:

1. In a telephone system in which a two-wire telephone network carries telephone voice signals in a telephone voice band between a first telephone equipment and a second telephone equipment coupled to the telephone network, a method for bi-directional communication in a high frequency band of frequencies above the telephone voice band of information between a first transceiver and a second transceiver coupled to the two-wire telephone network comprising:

accepting a first signal at the first transceiver;

transmitting a first transmitted signal that encodes control information in the first signal from the first transceiver to the second transceiver over the two-wire telephone network in a first range of frequencies in the high frequency band;

receiving the first transmitted signal at the second transceiver;

providing the control information to a source of information;

accepting at the second transceiver a second signal from the source of information;

transmitting a second transmitted signal that encodes information in the second signal from the second transceiver to the first transceiver over the two-wire telephone network in a second range of frequencies in the high frequency band;

preventing transmission of signals in the high frequency band from the two-wire telephone network to telephone equipment coupled to the two-wire telephone network, including preventing transmission of the second transmitted signal to the second telephone equipment;

receiving the second transmitted signal at the first transceiver; and providing information in the second signal from the first transceiver to a destination of information;

wherein the first range of frequencies is smaller than the second range of frequencies.

2. The method of claim 1 wherein the first range of frequencies is at lower frequencies than and disjoint from the second range of frequencies.

3. In a telephone system in which a two-wire telephone network carries telephone voice signals in a telephone voice band between a first telephone equipment and a second telephone equipment coupled to the telephone network, a method for bi-directional communication in a high frequency band of frequencies above the telephone voice band of information between a first transceiver and a second transceiver coupled to the two-wire telephone network comprising:

accepting a first signal at the first transceiver;

transmitting a first transmitted signal that encodes control information in the first signal from the first transceiver to the second transceiver over the two-wire telephone network in a first range of frequencies in the high frequency band;

receiving the first transmitted signal at the second transceiver;

providing the control information to a source of information;

accepting at the second transceiver a second signal from the source of information;

transmitting a second transmitted signal that encodes information in the second signal from the second transceiver to the first transceiver over the two-wire telephone network in a second range of frequencies in the high frequency band;

preventing transmission of signals in the high frequency band from the two-wire telephone network to telephone equipment coupled to the two-wire telephone network, including preventing transmission of the second transmitted signal to the second telephone equipment;

receiving the second transmitted signal at the first transceiver;

providing information in the second signal from the first transceiver to a destination of information; and preventing transmission of signals in the high frequency band from a conductive path joining the first transceiver and the second transceiver on the two-wire telephone network to one or more telephone devices coupled to said conductive path at locations other than the locations of the first transceiver and the second transceiver.

4. The method of claim 3 wherein the first transceiver, the first telephone equipment, and the one or more telephone devices are all coupled to the two-wire telephone network within a single residence.

5. The method of claim 3 wherein preventing transmission of signals in the high frequency band to the one or more telephone devices includes coupling a plurality of separate low-pass filters each between the two-wire telephone network and different one of the one or more telephone devices such that the low-pass filter passes signals in the telephone voice band between the two-wire telephone network and said telephone device and presents a high impedance at frequencies in the high frequency band to the two-wire telephone network.

6. In a telephone system in which a two-wire telephone network carries telephone voice signals in a telephone voice band between a first telephone equipment and a second telephone equipment coupled to the telephone network, a method for bi-directional communication in a high frequency band of frequencies above the telephone voice band of information between a first transceiver and a second transceiver coupled to the two-wire telephone network comprising:

accepting a first signal at the first transceiver;

transmitting a first transmitted signal that encodes control information in the first signal from the first transceiver to the second transceiver over the two-wire telephone network in the high frequency band;

receiving the first transmitted signal at the second transceiver;

providing the control information to a source of information;

accepting at the second transceiver a second signal from the source of information;

transmitting a second transmitted signal that encodes information in the second signal from the second transceiver to the first transceiver over the two-wire telephone network in the high frequency band;

preventing transmission of signals in the high frequency band from the two-wire telephone network to telephone equipment coupled to the two-wire telephone network, including preventing transmission of the second transmitted signal to the second telephone equipment;

receiving the second transmitted signal at the first transceiver; and providing information in the second signal from the first transceiver to a destination of information;

wherein the two-wire telephone network includes a segment that forms a branch on a conductive path joining the first transceiver and the second transceiver and wherein transmitting the second transmitted signal onto the two-wire telephone network includes processing the second signal to form the second transmitted signal to mitigate effects resulting from the branch on the conductive path.

7. The method of claim 6 wherein processing the second signal includes forming the second transmitted signal by processing the second signal such that the range of attenuation of signals passing from the first transceiver to the second transceiver in the second frequency range is smaller than the range of attenuation of signals in the frequency range of the second signal.

8. The method of claims 1, 3, or 6 further comprising preventing transmission of signals in the telephone voice band from the two-wire telephone network to at least one the first transceiver and the second transceiver.

9. The method of claim 8 wherein preventing transmission of signals in the telephone voice band from the two-wire telephone network to the first transceiver and to the second transceiver includes coupling a separate high-pass filter between the two-wire telephone network and each of the first transceiver and the second transceiver such that each high-pass filter passes signals in the high frequency band and present a high impedance at frequencies in the telephone voice band to the two-wire telephone network.

10. The method of claims 1, 3, or 6 wherein preventing transmission of signals in the high frequency band to the second telephone equipment includes coupling a low-pass filter between the second telephone equipment and the two-wire telephone network such that the low-pass filter passes signals in the telephone voice band between the two-wire telephone network and the second telephone equipment and presents a high impedance at frequencies in the high frequency band to the two-wire telephone network.

11. The method of claims 1, 3 or 6 wherein transmitting the second transmitted signal onto the two-wire telephone network includes applying a balanced signal to the two-wire telephone network.

12. The method of claims 1, 3, or 6 wherein accepting the second signal includes accepting a video signal.

13. The method of claim 12 wherein accepting the video signal includes accepting an NTSC video signal.

14. The method of claim 12 wherein transmitting the second transmitted signal includes transmitting a compressed video signal.

15. The method of claim 12 wherein accepting the first signal includes accepting a wireless signal that encodes the control information.

16. The method of claim 15 wherein accepting the wireless signal includes receiving an infrared signal.

17. The method of claim 12 wherein the control information encoded in the first transmitted signal identifies video programming that is to be encoded in the second signal.

18. The method of claim 12 further comprising accepting an input from a user, encoding the input in the first signal, providing the first signal to the first transceiver, and determining the control information encoded in the first transmitted signal from the encoded manual input.

19. The method of claim 12 wherein the control information encoded in the first transmitted signal includes a command to interrupt transmission of the second transmitted signal.

20. A system for bi-directional communication of information in a high band of frequencies above a telephone voice band of frequencies over a two-wire telephone network used to carry telephone voice signals in the telephone voice band between a first telephone equipment and a second telephone equipment coupled to the two-wire telephone network comprising:

a first transceiver coupled to the two-wire telephone network including
  circuitry for accepting a first signal, and
  circuitry for transmitting onto the two-wire telephone network in a first range of frequencies in the high frequency band a first transmitted signal that encodes control information in the first signal;

a second transceiver coupled to the two-wire telephone network including
  circuitry for receiving the first transmitted signal from the two-wire telephone network,
  circuitry for recovering the control information from the received first transmitted signal,
  circuitry for providing the control information to a source for information,
  circuitry for accepting a second signal from the source of information, and
  circuitry for transmitting onto the two-wire telephone network in a second range of frequencies in the high frequency band a second transmitted signal that encodes information in the second signal;

circuitry coupled between the second telephone equipment and the two-wire telephone network for preventing transmission of signals in the high frequency band from the two-wire telephone network to telephone equipment coupled to the two-wire telephone network; wherein the first transceiver further includes circuitry for receiving the second transmitted signal from the two-wire telephone network, circuitry for recovering information in the second signal from the second transmitted signal, and circuitry for providing the recovered information to a destination of information; and wherein the first range of frequencies is smaller second range of frequencies.

21. The system of claim 20 wherein the first range of frequencies is at lower frequencies than and disjoint from the second range of frequencies.

22. A system for bi-directional communication of information in a high band of frequencies above a telephone voice band of frequencies over a two-wire telephone network used to carry telephone voice signals in the telephone voice band between a first telephone equipment and a second telephone equipment coupled to the two-wire telephone network comprising:

a first transceiver coupled to the two-wire telephone network including
    circuitry for accepting a first signal, and
    circuitry for transmitting onto the two-wire telephone network in the high frequency band a first transmitted signal that encodes control information in the first signal;

a second transceiver coupled to the two-wire telephone network including
    circuitry for receiving the first transmitted signal from the two-wire telephone network,
    circuitry for recovering the control information from the received first transmitted signal,
    circuitry for providing the control information to a source for information,
    circuitry for accepting a second signal from the source of information, and
    circuitry for transmitting onto the two-wire telephone network in the high band of frequencies a second transmitted signal that encodes information in the second signal; and circuitry coupled between the second telephone equipment and the two-wire telephone network for preventing transmission of signals in the high frequency band from the two-wire telephone network to telephone equipment coupled to the two-wire telephone network;

wherein the first transceiver further includes
    circuitry for receiving the second transmitted signal from the two-wire telephone network,
    circuitry for recovering information in the second signal from the second transmitted signal, and
    circuitry for providing the recovered information to a destination of information; and;

wherein the system further comprises circuitry for coupling one or more telephone devices to a conductive path joining the first transceiver and the second transceiver on the two-wire telephone network at locations other than locations of the first transceiver or the second transceiver and for presenting high impedance in the high band of frequencies to said telephone network.

23. The system of claim 22 wherein the first transceiver, the first telephone equipment, and the one or more telephone devices are all coupled to the two-wire telephone network within a single residence.

24. The system of claim 22 wherein the circuitry for coupling the one or more telephone devices to the two-wire telephone network includes a plurality of separate low-pass filters each coupled between the two-wire telephone network and a different one of the one or more telephone devices such that each low-pass filter passes signals in the telephone voice band between the two-wire telephone network and said telephone device and presents a high impedance at frequencies in the high frequency band to the two-wire telephone network.

25. A system for bi-directional communication of information in a high band of frequencies above a telephone voice band of frequencies over a two-wire telephone network used to carry telephone voice signals in the telephone voice band between a first telephone equipment and a second telephone equipment coupled to the two-wire telephone network comprising:

a first transceiver coupled to the two-wire telephone network including
    circuitry for accepting a first signal, and
    circuitry for transmitting onto the two-wire telephone network in the high frequency band a first transmitted signal that encodes control information in the first signal;

a second transceiver coupled to the two-wire telephone network including
    circuitry for receiving the first transmitted signal from the two-wire telephone network,
    circuitry for recovering the control information from the received first transmitted signal,
    circuitry for providing the control information to a source for information,
    circuitry for accepting a second signal from the source of information, and
    circuitry for transmitting onto the two-wire telephone network in the high band of frequencies a second transmitted signal that encodes information in the second signal; and circuitry coupled between the second telephone equipment and the two-wire telephone network for preventing transmission of signals in the high frequency band from the two-wire telephone network to telephone equipment coupled to the two-wire telephone network;

wherein the first transceiver further includes
    circuitry for receiving the second transmitted signal from the two-wire telephone network,
    circuitry for recovering information in the second signal from the second transmitted signal, and
    circuitry for providing the recovered information to a destination of information; and wherein the two-wire telephone network includes a segment that forms a branch on a conductive path joining the first transceiver and the second transceiver and wherein the second transceiver further includes circuitry for processing the second signal to form the second transmitted signal to mitigate effects resulting from the branch on the conductive path.

26. The system of claims 20, 22, or 25 wherein the circuitry for processing the second signal includes circuitry for transforming the second signal into the second transmitted signal such that the range of attenuation of signals passing from the second transceiver to the first transceiver in the frequency range of the second transmitted signal is smaller than the range of attenuation of signals in the frequency range of the second signal.

27. The system of claims 20, 22, or 25 further comprising circuitry for preventing transmission of signals in the telephone voice band from the two-wire telephone network to the first transceiver and circuitry for preventing transmission of signals in the telephone voice band from the two-wire telephone network to the second transceiver.

28. The system of claims 20, 22, or 25 wherein the circuitry coupled between the second telephone equipment and the two-wire telephone network includes a low-pass filter coupled between the second telephone equipment and the two-wire telephone network such that the low-pass filter passes signals in the telephone voice band between the two-wire telephone network and the second telephone equipment and presents a high impedance at frequencies in the high frequency band to the two-wire telephone network.

29. The system of claims 20, 22, or 25 wherein the circuitry for transmitting the second transmitted signal onto the two-wire telephone network includes circuitry for balancing the second transmitted signal prior to applying it to said telephone network.

30. The system of claims 20, 22, or 25 wherein the circuitry for accepting the second signal includes circuitry for accepting a video signal.

31. The system of claim 30 wherein the circuitry for accepting the video signal includes circuitry for accepting an NTSC video signal.

32. The system of claim 30 wherein the circuitry for transmitting the second transmitted signal includes circuitry for transmitting a compressed video signal.

33. The system of claim 30 wherein the circuitry for accepting the first signal includes circuitry for accepting a wireless signal that encodes the control information.

34. The system of claim 33 wherein the circuitry for accepting the wireless signal includes circuitry for receiving an infrared signal.

35. The system of claims 20, 22, or 25 wherein the first transceiver further includes coupling circuitry coupled to the two-wire telephone network, to a first signal path for passing the first transmitted signal to the two-wire telephone network, and to a second signal path for passing the second transmitted signal from the two-wire telephone network.

36. The system of claim 35 wherein the coupling circuitry matches impedance characteristics of the first and the second signal paths and the two-wire telephone network.

37. The system of claim 35 wherein the coupling circuitry includes circuitry for preventing signals in the second range of frequencies from passing over the first signal path.

38. The system of claim 24 wherein the two-wire telephone network includes a segment that forms a branch on the conductive path joining the first transceiver and the second transceiver and wherein the second transceiver further includes circuitry for processing the second signal to mitigate effects resulting from the branch on the conductive path.

39. The system of claim 38 wherein at least some of the one or more telephone devices are coupled to the two-wire telephone network on branches from the path on the two-wire telephone network joining the first transceiver and the second transceiver.

40. The system of claim 24 wherein the circuitry for transmitting onto the two-wire telephone network in the high frequency band of frequencies the second transceiver is configured to pre-emphasize the second transmitted signal.

41. The system of claim 40 wherein said circuitry for transmitting the second transmitted further circuitry for balancing the second transmitted signal prior to transmission onto the telephone network.

42. The system of claim 25 wherein the first transmitted signal and the second transmitted signal do not interfere with one another when transmitted concurrently onto the two-wire telephone network.

43. The system of claim 42 wherein the first transmitted signal and the second transmitted signal occupy different frequency ranges within the high band of frequencies.

44. The system of claim 25 wherein the circuitry for transmitting onto the two-wire telephone network in the high frequency band of frequencies the second transceiver is configured to pre-emphasize the second transmitted signal.

45. The system of claim 44 wherein said circuitry for transmitting the second transmitted signal further includes circuitry for balancing a voltage of the second transmitted signal across two conductors of the two-wire telephone network.

46. The system of claim 25 wherein the system further comprises circuitry for coupling one or more telephone devices to the two-wire telephone network at locations other than locations of the first transceiver or the second transceiver and presenting high impedance in the high band of frequencies to said telephone network.

47. A system for communication in a high band of frequencies above a telephone voice band of frequencies over a two-wire telephone network forming two conductive paths between devices coupled to said network and used to carry telephone voice signals in the telephone voice band, said system comprising:

a plurality of devices for communicating in the high band of frequencies coupled at separated points on a conductive path of the two-wire telephone network, including a first device, a second device, and a third device;

wherein the first device includes circuitry for receiving information transmitted over the two-wire telephone network in the high band of frequencies and each of the second device and third device includes circuitry for selectively transmitting information onto the two-wire telephone network in a shared range of frequencies in the high band of frequencies without interfering with voice signals carried in the telephone voice band whereby either of the second and third devices can pass information to the first device over the two-wire network to the first device.

48. The system of claim 47 wherein the system further includes a circuitry coupled between the two-wire telephone network and one or more telephone device, wherein the circuitry presents a high impedance in the high band of frequencies to the two-wire telephone network.

49. The system of claim 48 wherein the system further includes circuitry coupled between the two-wire telephone network and the plurality of devices for communicating in the high band of frequencies, said circuitry blocking signals outside the high band of frequencies from passing from the two-wire telephone network to said devices.

50. The system of claim 47 wherein the two-wire telephone network includes one or more splits forming branches in the network, and wherein the circuitry for transmitting information in the high band of frequencies includes:

circuitry for accepting an information-bearing signal; and circuitry for processing said information-bearing signal for transmission to the first device, wherein said circuitry is configured to reduce signal degradation caused by the branching of the network.

51. The system of claim 50 wherein the circuitry for processing said signal includes circuitry for frequency-shifting the information-bearing signal.

52. The system of claim 50 wherein the circuitry for processing said signal includes circuitry for spectral pre-emphasis of said signal.

53. The system of claim 50 wherein the circuitry for transmitting information in the high band of frequencies includes circuitry for balancing the signal transmitted onto the two-wire telephone network.

54. A method for communication in a high band of frequencies above a telephone voice band of frequencies over a two-wire telephone network forming two conductive paths between devices coupled to said network and used to carry telephone voice signals in the telephone voice band, said method comprising:

coupling a plurality of devices for communicating in the high band of frequencies at separated points to a conductive path of the two-wire telephone network, including coupling a first device, a second device, and a third device to said network;

at a first time, transmitting information from the second device onto the two-wire telephone network in a shared range of frequencies in the high band of frequencies to the first device, and concurrently disabling the third device from transmitting onto the said network in said shared range of frequencies; and at a second time, transmitting information from the third device onto the two-wire telephone network in the shared range of frequencies in the high band of frequencies to the first device, and concurrently disabling the second device from transmitting onto the said network in said shared range of frequencies.

55. The method of claim 54 further comprising:

coupling circuitry between the two-wire telephone network and one or more telephone device; and presenting a high impedance in the high band of frequencies at said circuitry to the two-wire telephone network.

56. The method of claim 55 further comprising:

coupling circuitry between the two-wire telephone network and the plurality of devices for communicating in the high band of frequencies; and blocking signals outside the high band of frequencies from passing from the two-wire telephone network through said circuitry to said devices.

57. The method of claim 54 wherein the two-wire telephone network includes one or more splits forming branches in the network, and wherein transmitting information from the second device onto the two-wire telephone network includes:

accepting an information-bearing signal; and processing said information-bearing signal for transmission to the first device, including reducing signal degradation caused by the branching of the network.

58. The method of claim 57 wherein processing said signal includes frequency-shifting the information-bearing signal.

59. The method of claim 57 wherein processing said signal includes spectral pre-emphasis of said signal.

60. The method of claim 57 wherein transmitting information from the second device onto the two-wire telephone network includes balancing the signal transmitted onto the two-wire telephone network.

61. A method for distributing information in a high band of frequencies above a telephone voice band of frequencies over a two-wire telephone network forming a conductive path between devices coupled to said network and used to carry telephone voice signals in the telephone voice band, said method comprising:

coupling a plurality of devices for communicating in the high band of frequencies at separated points to the conductive path;

at a first time, transmitting information from a first of the plurality of devices onto the two-wire telephone network in a shared range of frequencies in the high band of frequencies, and concurrently disabling a second of the plurality of devices from transmitting onto the said network in said shared range of frequencies; and at a second time, transmitting information from the second of the devices onto the two-wire telephone network in the shared range of frequencies in the high band of frequencies, and concurrently disabling the first of the devices from transmitting onto the said network in said shared range of frequencies;

wherein the two-wire telephone network includes a segment that forms a branch on the conductive path and wherein transmitting information from the first of the devices and from the second of the devices onto the two-wire telephone network includes processing the information to form signals to mitigate effects resulting from the branch on the conductive paths.

62. The method of claim 61 further comprising:

coupling circuitry between the two-wire telephone network and one or more telephone device at locations other that locations of the plurality of devices; and presenting a high impedance in the high band of frequencies at said circuitry to the two-wire telephone network.

63. The method of claim 62 further comprising:

coupling circuitry between the two-wire telephone network and the plurality of devices for communicating in the high band of frequencies; and blocking signals outside the high band of frequencies from passing from the two-wire telephone network through said circuitry to said devices.

\* \* \* \* \*

UNITED STATES PATENT AND TRADEMARK OFFICE
Certificate

Patent No. 6,236,718 B1                                                                       Patented: May 22, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David D. Goodman, Arlington, VA; and Dr. Robert H. Domnitz, Lincoln, MA.

Signed and Sealed this Nineteenth Day of August 2003.

<div align="right">
CURTIS KUNTZ<br>
<em>Supervisory Patent Examiner</em><br>
Art Unit 2643
</div>